United States Patent
Kothinti Naresh et al.

(10) Patent No.: US 9,830,152 B2
(45) Date of Patent: Nov. 28, 2017

(54) SELECTIVE STORING OF PREVIOUSLY DECODED INSTRUCTIONS OF FREQUENTLY-CALLED INSTRUCTION SEQUENCES IN AN INSTRUCTION SEQUENCE BUFFER TO BE EXECUTED BY A PROCESSOR

(71) Applicant: QUALCOMM Incorporated, San Diego, CA (US)

(72) Inventors: Vignyan Reddy Kothinti Naresh, Morrisville, NC (US); Shivam Priyadarshi, Raleigh, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/977,840

(22) Filed: Dec. 22, 2015

(65) Prior Publication Data

US 2017/0177366 A1 Jun. 22, 2017

(51) Int. Cl.
*G06F 9/30* (2006.01)
*G06F 9/38* (2006.01)

(52) U.S. Cl.
CPC ........ *G06F 9/30058* (2013.01); *G06F 9/3016* (2013.01); *G06F 9/3802* (2013.01); *G06F 9/3867* (2013.01)

(58) Field of Classification Search
None
See application file for complete search history.

(56) References Cited

U.S. PATENT DOCUMENTS 6,044,220 A * 3/2000 Breternitz, Jr. ..... G06F 9/45504
717/139
7,356,673 B2 * 4/2008 Altman ................ G06F 9/3802
712/213

(Continued)

FOREIGN PATENT DOCUMENTS

CN 104298488 A 1/2015

OTHER PUBLICATIONS

International Search Report and Written Opinion for PCT/US2016/065120, dated Mar. 7, 2017, 14 pages.

(Continued)

*Primary Examiner* — Eric Coleman
(74) *Attorney, Agent, or Firm* — Withrow & Terranova, PLLC

(57) ABSTRACT

Selective storing of previously decoded instructions of frequently-called instruction sequences in an instruction sequence buffer to be executed by a processor is disclosed. In one aspect, a selective instruction sequence buffer controller is configured to selectively store previously decoded instructions for an instruction sequence by determining if a received instruction address corresponds to an instruction sequence captured in an instruction sequence buffer. If the received instruction address corresponds to a captured instruction sequence, the selective instruction sequence buffer controller provides corresponding micro-operations stored in the instruction sequence buffer for execution. If the received instruction address does not correspond to the captured instruction sequence, the selective instruction sequence buffer controller reduces a frequency indicator of the instruction sequence. The selective instruction sequence buffer controller may also increase the frequency indicator of the instruction sequence when the instruction sequence is (Continued)

accessed, capturing the instruction sequence once the frequency indicator meets a threshold.

30 Claims, 25 Drawing Sheets

(56) References Cited

U.S. PATENT DOCUMENTS

| | | | |
|---|---|---|---|
| 7,873,820 B2 | 1/2011 | Knoth | |
| 9,710,276 B2* | 7/2017 | Suggs | G06F 9/30065 |
| 9,753,733 B2* | 9/2017 | Blasco-Allue | G06F 9/381 |
| 2002/0095553 A1 | 7/2002 | Mendelson et al. | |
| 2002/0178350 A1* | 11/2002 | Chung | G06F 9/383 |
| | | | 712/235 |
| 2003/0065905 A1* | 4/2003 | Ishii | G06F 9/325 |
| | | | 712/23 |
| 2005/0223364 A1 | 10/2005 | Peri et al. | |
| 2012/0124301 A1 | 5/2012 | Hardage et al. | |
| 2013/0339700 A1 | 12/2013 | Blasco-Allue et al. | |
| 2014/0136822 A1 | 5/2014 | Suggs et al. | |
| 2014/0189306 A1 | 7/2014 | Merten et al. | |
| 2014/0189331 A1 | 7/2014 | Lipshits et al. | |
| 2014/0208085 A1 | 7/2014 | Chung et al. | |
| 2015/0012726 A1 | 1/2015 | Combs et al. | |
| 2015/0227374 A1 | 8/2015 | Blasco et al. | |

OTHER PUBLICATIONS

Bellas, N. et al., "Energy and Performance Improvements in Microprocessor Design using a Loop Cache," 1999 International Conference on Computer Design (ICCD '99), IEEE, Oct. 10-13, 1999, pp. 378-383.

Solomon, B. et al., "Micro-Operation Cache: A Power Aware Frontend for Variable Instruction Length ISA," IEEE Transactions on Very Large Scale Integration (VLSI) Systems, vol. 11, No. 5, IEEE, Oct. 2003, pp. 801-811.

* cited by examiner

FIG. 3

| 146C(0) | 146C(1) | 146C(2) | 146C(3) | 146C(4) | 146C(5) | 146C(6) | 146C(7) |
|---|---|---|---|---|---|---|---|
| IS TGT ADDR (64b) | IS BR ADDR (64b) | COUNT | UB ENTRIES | START INDEX (8b) | STATE (2b) | BRANCH PROFILE (32b) | SCORE |
| 0x4010 | 0x4060 | 2162 | 0xF0 | 8 | CAPTURED | 0x9 | 7 |
| 0x5000 | 0x5040 | 501 | | | TRAINING | 0x0 | 0 |
| ... | | | | | INVALID | | 0 |
| 0xebb0 | 0xec00 | 18048 | | | OVERWRITTEN | 0x2C | 3 |

$E_0, E_1, ... E_p$ ← ISAT (146)

FIG. 4

| 144C(0) | 144C(1) | 144C(2) |
|---|---|---|
| UOP DATA (5 x 128 x 586) | T NEXT INDEX (8b) | NT NEXT INDEX (8b) |
| 0x8640 | 1 | 1 |

$B_0$ ← INSTRUCTION SEQUENCE BUFFER (144)

TAT (150)

| BRANCH TARGET ADDRESS | UOP BUFFER INDEX |
|---|---|
| 0x8654 | 4 |

ISB (144')

| INDEX | UOP DATA | T NEXT INDEX(8b) | NT NEXT INDEX(8b) |
|---|---|---|---|
| 0 | 0x8640 | -- | 1 |
| 1 | 0x8644 | -- | 2 |
| 2 | 0x8648 | -- | 3 |
| 3 | 0x864C | 4 | 7 |
| 4 | 0x8654 | -- | 5 |
| 5 | 0x8658 | -- | 6 |
| 6 | 0x865C | 0 | -- |
| 7 | 0x8650 | -- | 4 |

ISB (144)

| INDEX | UOP DATA | T NEXT INDEX(8b) | NT NEXT INDEX(8b) |
|---|---|---|---|
| 0 | 0x8640 | -- | 1 |
| 1 | 0x8644 | -- | 2 |
| 2 | 0x8648 | -- | 3 |
| 3 | 0x864C | 4 | 7 |
| 4 | 0x8654 | -- | 5 |
| 5 | 0x8658 | 0 | 6 |
| 6 | 0x865C | -- | -- |
| 7 | 0x8650 | -- | 8 |
| 8 | 0x8654 | -- | 9 |
| 9 | 0x8658 | -- | 10 |
| 10 | 0x865C | 0 | -- |

FIG. 7

SELECTIVE STORING OF PREVIOUSLY DECODED INSTRUCTIONS OF FREQUENTLY-CALLED INSTRUCTION SEQUENCES IN AN INSTRUCTION SEQUENCE BUFFER TO BE EXECUTED BY A PROCESSOR

BACKGROUND

I. Field of the Disclosure

The technology of the disclosure relates generally to instruction pipelining in processors, and more particularly to selectively storing micro-operations corresponding to an instruction sequence in a buffer.

II. Background

Instruction pipelining is a processing technique whereby the throughput of computer instructions being executed by a processor may be increased. In this regard, the handling of each instruction is split into a series of steps as opposed to each instruction being processed sequentially and fully executed before processing a next instruction. These steps are executed in an instruction pipeline composed of multiple stages. There are several cycles between the time an instruction is fetched from memory until the time the instruction is actually executed as the instruction flows through various pipeline stages of the instruction pipeline.

Conventionally, an instruction pipeline decodes an instruction after the instruction is fetched in a previous step. An instruction may be decoded into a series of shorter operations known as micro-operations or micro-ops. If a processor accesses a particular pattern of instructions multiple times (e.g., in a loop), the instruction pipeline may perform the same fetch and decode steps each time the same pattern of instructions is accessed. In this manner, processors may employ dedicated storage configured to store the micro-ops generated as a result of decoding a pattern of instructions. If the processor is instructed to access a pattern of instructions from a given fetch address, the processor searches the dedicated storage for the micro-ops corresponding to the fetch address. If the micro-ops have been previously decoded and stored in the dedicated storage, the micro-ops can be supplied from the dedicated storage to the processor, thus avoiding the need to re-fetch and re-decode the pattern of instructions. Supplying previously stored micro-ops for instructions to be executed rather than newly fetching and decoding such instructions allows the fetch and decode circuits in the instruction pipeline to be temporarily disabled, thus reducing power consumption.

A micro-op cache may be employed to provide dedicated storage for storing micro-ops for previously decoded instructions described above. A micro-op cache is conventionally configured to store micro-ops corresponding to a range of instruction patterns, including complex instruction sequences such as complex instruction loops. However, the ability to store micro-ops corresponding to complex instruction sequences generally results in a micro-op cache design having relatively high area and power consumption. In this regard, alternative to a micro-op cache, a micro-op buffer can be employed for storing micro-ops for previously decoded instructions. A micro-op buffer is conventionally designed to consume less area and power as compared to a micro-op cache. However, a micro-op buffer is only able to store micro-ops corresponding to simple instruction sequences, such as simple instruction loops, and not micro-ops corresponding to complex instruction sequences.

Thus, it would be advantageous to store micro-ops corresponding to complex instruction sequences in dedicated storage while consuming less area and power than provided by a micro-op cache.

SUMMARY OF THE DISCLOSURE

Aspects disclosed in the detailed description include selective storing of previously decoded instructions of frequently-called instruction sequences in an instruction sequence buffer to be executed by a processor. An instruction sequence refers to any set of instructions to be executed by a processor. Examples of instruction sequences that are frequently and repeatedly fetched and executed can be a result of instruction loops, procedure/function calls, and interrupt service routines, as non-limiting examples of instruction sequences. The previously decoded instructions, also known as micro-operations or micro-ops, are generated during a decode stage of instruction processing. The micro-ops of more frequently-called instruction sequences are stored for later retrieval rather than re-fetching and re-decoding the instructions each time the instruction sequence is accessed. Selectively storing micro-ops of frequently-called instruction sequences increases processor efficiency by giving the processor access to micro-ops requested on a more frequent basis, as opposed to storing instruction sequences called less frequently. In this regard, in certain aspects disclosed herein, a selective instruction sequence buffer controller configured to store previously decoded instructions for an instruction sequence is provided in a processor. The selective instruction sequence buffer controller is configured to determine if a received instruction address corresponds to an instruction sequence captured in an instruction sequence buffer. Each instruction of the instruction sequence captured in the instruction sequence buffer includes corresponding micro-ops that carry out the operation of the instruction sequence. If the received instruction address corresponds to an instruction sequence captured in the instruction sequence buffer, the selective instruction sequence buffer controller provides the corresponding micro-ops for execution. However, if the received instruction address does not correspond to a captured instruction sequence in the instruction sequence buffer, the selective instruction sequence buffer controller reduces a frequency indicator indicative of the frequency in which the instruction sequence is executed. The selective instruction sequence buffer controller may also increase the frequency indicator of the instruction sequence in response to the instruction sequence being called by the processor, and capture the instruction sequence in the instruction sequence buffer once the frequency indicator meets a certain frequency threshold. In this manner, by storing the micro-ops of the more frequently-called instruction sequences, the selective instruction sequence buffer controller reduces power consumption of the processor, as the fetch and decode circuits may be disabled when the micro-ops of are provided from the instruction sequence buffer.

In this regard in one aspect, a selective instruction sequence buffer controller for storing previously decoded instructions for an instruction sequence to be executed by a processor is provided. The selective instruction sequence buffer controller is configured to receive an instruction address for a next instruction to be fetched for execution into an instruction pipeline in an instruction processing system. The selective instruction sequence buffer controller is further configured to determine if the received instruction address corresponds to a captured instruction sequence in an instruction sequence buffer. The captured instruction sequence comprises micro-operations of corresponding instructions configured to be executed by an execution circuit in the instruction pipeline for execution of the captured instruction sequence. The selective instruction sequence buffer controller is further configured to, responsive to determining that the received instruction address corresponds to a captured instruction sequence in the instruction sequence buffer, provide the micro-operations corresponding to the captured instruction sequence in the instruction sequence buffer for execution by the execution circuit. The selective instruction sequence buffer controller is configured to, responsive to determining that the received instruction address does not correspond to a captured instruction sequence in the instruction sequence buffer, reduce a frequency indicator corresponding to the captured instruction sequence in the instruction sequence buffer. The frequency indicator is indicative of a frequency in which the captured instruction sequence is executed by the instruction processing system.

In another aspect, a selective instruction sequence buffer controller for storing previously decoded instructions for an instruction sequence to be executed by a processor is provided. The selective instruction sequence buffer controller comprises means for receiving an instruction address for a next instruction to be fetched for execution into an instruction pipeline in an instruction processing system. The selective instruction sequence buffer controller further comprises means for determining if the received instruction address corresponds to a captured instruction sequence in an instruction sequence buffer. The captured instruction sequence comprises micro-operations of corresponding instructions configured to be executed by an execution circuit in the instruction pipeline for execution of the captured instruction sequence. The selective instruction sequence buffer controller further comprises means for providing the micro-operations corresponding to the captured instruction sequence in the instruction sequence buffer for execution by the execution circuit in response to determining that the received instruction address corresponds to a captured instruction sequence in the instruction sequence buffer. The selective instruction sequence buffer controller further comprises means for reducing a frequency indicator corresponding to the captured instruction sequence in the instruction sequence buffer in response to determining that the received instruction address does not correspond to the captured instruction sequence in the instruction sequence buffer. The frequency indicator is indicative of a frequency in which the captured instruction sequence is executed by the instruction processing system.

In another aspect, a method for storing previously decoded instructions for an instruction sequence to be executed by a processor is provided. The method comprises receiving an instruction address for a next instruction to be fetched for execution into an instruction pipeline in an instruction processing system. The method further comprises determining if the received instruction address corresponds to a captured instruction sequence in an instruction sequence buffer. The captured instruction sequence comprises micro-operations of corresponding instructions configured to be executed by an execution circuit in the instruction pipeline for execution of the captured instruction sequence. The method further comprises, responsive to determining that the received instruction address corresponds to a captured instruction sequence in the instruction sequence buffer, providing the micro-operations corresponding to the captured instruction sequence in the instruction sequence buffer for execution by the execution circuit. The method further comprises, responsive to determining that the received instruction address does not correspond to the captured instruction sequence in the instruction sequence buffer, reducing a frequency indicator corresponding to the captured instruction sequence in the instruction sequence buffer. The frequency indicator is indicative of a frequency in which the captured instruction sequence is executed by the instruction processing system.

In another aspect, an instruction processing system for a processor is provided. The instruction processing system comprises one or more instruction pipelines each comprising an instruction fetch circuit configured to fetch instructions, an instruction decode circuit configured to decode instructions fetched by the fetch circuit, and an execution circuit configured to execute the decoded instructions. The instruction processing system further comprises a selective instruction sequence buffer controller for storing the previously decoded instructions for an instruction sequence to be executed by the instruction processing system. The selective instruction sequence buffer controller is configured to receive an instruction address for a next instruction to be fetched for execution into an instruction pipeline in the instruction processing system. The selective instruction sequence buffer controller is further configured to determine if the received instruction address corresponds to a captured instruction sequence in an instruction sequence buffer. The captured instruction sequence comprises micro-operations of corresponding instructions configured to be executed by the execution circuit in the instruction pipeline for execution of the captured instruction sequence. The selective instruction sequence buffer controller is further configured to, responsive to determining that the received instruction address corresponds to a captured instruction sequence in the instruction sequence buffer, provide the micro-operations corresponding to the captured instruction sequence in the instruction sequence buffer for execution by the execution circuit. The selective instruction sequence buffer controller is further configured to, responsive to determining that the received instruction address does not correspond to the captured instruction sequence in the instruction sequence buffer, reduce a frequency indicator corresponding to the captured instruction sequence in the instruction sequence buffer. The frequency indicator is indicative of a frequency in which the captured instruction sequence is executed by the instruction processing system.

BRIEF DESCRIPTION OF THE FIGURES

FIG. 3 is a diagram of an exemplary ISAT configured to be accessed by the selective instruction sequence buffer controller in FIG. 1 to store information corresponding to instruction loops that are stored in or may be stored in the ISB;

FIG. 4 is a diagram of an exemplary version of the instruction sequence buffer in FIG. 1, wherein the ISB is configured to store micro-operations, as well as taken and not taken indices corresponding to each micro-operation;

FIG. 7 is a diagram of an exemplary taken address table (TAT) used in conjunction with the selective instruction sequence buffer controller and the ISAT in FIG. 1, wherein the TAT is configured to store indices corresponding to micro-operations stored in the ISB so as to reduce the number of repetitive entries in the instruction sequence buffer;

DETAILED DESCRIPTION

Figure 1:
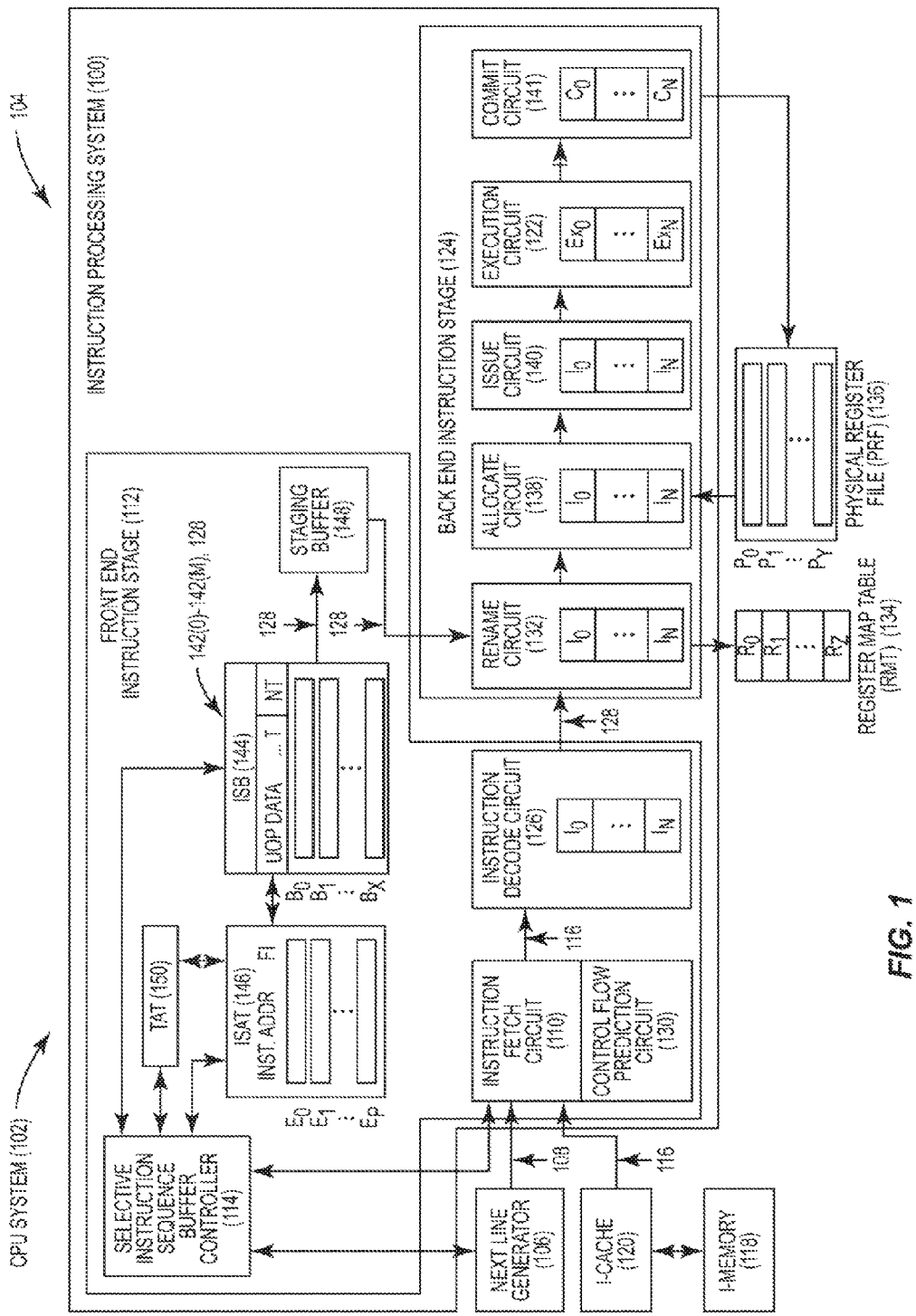
FIG. 1 is a block diagram of an exemplary instruction processing system in a central processing unit (CPU) system, wherein the instruction processing system includes a selective instruction sequence buffer controller configured to selectively store micro-operations of frequently-called instruction sequences in an instruction sequence buffer (ISB) based on information stored in an instruction sequence address table (ISAT)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include selective storing of previously decoded instructions of frequently-called instruction sequences in an instruction sequence buffer to be executed by a processor. An instruction sequence refers to any set of instructions to be executed by a processor. Examples of instruction sequences that are frequently and repeatedly fetched and executed can be a result of instruction loops, procedures/functions calls, and interrupt service routines, as non-limiting examples of instruction sequences. The previously decoded instructions, also known as micro-operations or micro-ops, are generated during a decode stage of instruction processing. The micro-ops of more frequently-called instruction sequences are stored for later retrieval rather than re-fetching and re-decoding the instructions each time the instruction sequence is accessed. Selectively storing micro-ops of frequently-called instruction sequences increases processor efficiency by giving the processor access to micro-ops requested on a more frequent basis, as opposed to storing instruction sequences called less frequently. In this regard, in certain aspects disclosed herein, a selective instruction sequence buffer controller configured to store previously decoded instructions for an instruction sequence is provided in a processor. The selective instruction sequence buffer controller is configured to determine if a received instruction address corresponds to an instruction sequence captured in an instruction sequence buffer. Each instruction of the instruction sequence captured in the instruction sequence buffer includes corresponding micro-ops that carry out the operation of the instruction sequence. If the received instruction address corresponds to an instruction sequence captured in the instruction sequence buffer, the selective instruction sequence buffer controller provides the corresponding micro-ops for execution. However, if the received instruction address does not correspond to a captured instruction sequence in the instruction sequence buffer, the selective instruction sequence buffer controller reduces a frequency indicator indicative of the frequency in which the instruction sequence is executed. The selective instruction sequence buffer controller may also increase the frequency indicator of the instruction sequence in response to the instruction sequence being called by the processor, and capture the instruction sequence in the instruction sequence buffer once the frequency indicator meets a certain frequency threshold. In this manner, by storing the micro-ops of the more frequently-called instruction sequences, the selective instruction sequence buffer controller reduces power consumption of the processor, as the fetch and decode circuits may be disabled when the micro-ops of are provided from the instruction sequence buffer.

In this regard, FIG. 1 is a block diagram of an exemplary instruction processing system 100 provided in a central processing unit (CPU) system 102. The CPU system 102 may be provided in a system-on-a-chip (SoC) 104 as an example. The instruction processing system 100 is configured to process instructions to be executed by a CPU or other processor or processing unit. In this regard, a next line generator 106 provides instruction addresses 108 to an instruction fetch circuit 110 provided in a front end instruction stage 112 of the instruction processing system 100. The next line generator 106 also provides the instruction addresses 108 to a selective instruction sequence buffer controller 114 of the instruction processing system 100. As discussed in more detail below, unless instructed otherwise by the selective instruction sequence buffer controller 114, the instruction fetch circuit 110 fetches instructions 116 corresponding to the instruction addresses 108 from an instruction memory 118. The instruction processing system 100 is capable of processing instructions 116 using out-of-order processing (OoP), if possible, to achieve greater throughput performance and parallelism. However, other aspects may include in-order processing (IoP). The instruction memory 118 may be provided in or as part of a system memory in the CPU system 102 as an example. An instruction cache 120 may also be provided in the CPU system 102, as shown in FIG. 1, to cache the instructions 116 from the instruction memory 118 to reduce latency in the instruction fetch circuit 110 fetching the instructions 116.

In this example, the instruction fetch circuit 110 is configured to provide the fetched instructions 116 into one or more instruction pipelines $I_0$-$I_N$ in the instruction processing system 100 to be pre-processed before the fetched instructions 116 reach an execution circuit 122 in a back end instruction stage 124 in the instruction processing system 100 to be executed. As will next be discussed, the instruction pipelines $I_0$-$I_N$ are provided across different processing circuits or stages of the instruction processing system 100 to pre-process and process the instructions 116 in a series of steps that perform concurrently to increase throughput prior to execution of the instructions 116 in the execution circuit 122.

With continuing reference to FIG. 1, the front end instruction stage 112 of the instruction processing system 100 in this example includes an instruction decode circuit 126. The instruction decode circuit 126 is configured to decode the fetched instructions 116 fetched by instruction fetch circuit 110 into micro-operations 128 (also referred to herein as micro-ops 128). Decoding the instructions 116 is used to determine the type of instructions and actions required, which in turn is used to determine in which instruction pipeline $I_0$-$I_N$ the micro-ops 128 of the instruction 116 should be placed. A control flow prediction circuit 130 is also provided in the front end instruction stage 112 to speculate or predict a target address for a control flow instruction 116, such as a conditional branch instruction. The prediction of the target address by the control flow prediction circuit 130 is used by the instruction fetch circuit 110 to determine the next instructions 116 to fetch behind the control flow instruction 116, assuming the control flow instruction 116 will be resolved to jump to the predicted target address.

With continuing reference to FIG. 1, in this example, the micro-ops 128 are placed in one or more of the instruction pipelines $I_0$-$I_N$ corresponding to the instructions 116 and are next provided to a rename circuit 132 in the back end instruction stage 124 of the instruction processing system 100. The rename circuit 132 is configured to determine if any register names in the micro-ops 128 need to be renamed to break any register dependencies that would prevent parallel or out-of-order processing (OoP) of the instructions 116. Further, the number of architectural registers provided in the CPU system 102 may be limited. In this regard, the rename circuit 132 provided in the back end instruction stage 124 is configured to call upon a register map table (RMT) 134 to rename the logical source and destination register names to available physical register names in a physical register file (PRF) 136 that typically provides more registers than architectural registers available. An allocate circuit 138 in a next step of the back end instruction stage 124 reads the physical registers containing source operands from the PRF 136 to determine if the instruction 116 responsible for producing the value has been executed. If the producing instruction 116 has not yet been executed, the value will be received by the producing instruction 116 via a live forwarding path. An issue circuit 140 (also known as a "dispatch circuit") can dispatch micro-ops 128 out of order to execution units $E_{X0}$-$E_{XN}$ in the execution circuit 122 after identifying and arbitrating among the instructions 116 that have all their source operations ready. A commit circuit 141 is also provided in the back end instruction stage 124 as a final stage configured to update the architectural and memory state of the CPU system 102 for executed instructions 116 and to process exceptions caused by the executed instructions 116.

With continuing reference to FIG. 1, power is consumed each time the instruction fetch circuit 110 fetches the instructions 116 from the instruction memory 118 or the instruction cache 120. Similarly, additional power is consumed each time the instruction decode circuit 126 decodes the fetched instructions 116 into the micro-ops 128. In other words, multiple cycles of fetching and decoding instructions 116 contributes to the power consumption of the instruction processing system 100. Thus, reducing the frequency in which the instruction fetch circuit 110 and the instruction decode circuit 126 are accessed may reduce the power consumption of the instruction processing system 100.

In this regard, as discussed in greater detail below, the selective instruction sequence buffer controller 114 is configured to prioritize capturing (e.g., storing) the micro-ops 128 of frequently-called instructions 116. In other words, an instruction sequence buffer (ISB) 144 has a limited capacity such that the ISB 144 may not be able to capture micro-ops 128 corresponding to each instruction 116. Thus, the selective instruction sequence buffer controller 114 is configured to conduct training so as to determine which instructions 116 are frequently-called. The selective instruction sequence buffer controller 114 is configured to train in this manner by keeping track of the frequency in which each pattern of instructions 116 is called. The selective instruction sequence buffer controller 114 may keep track of such a frequency by increasing a metric in response to calling the instructions 116 and decreasing the metric in response to not calling the instructions 116. By capturing the micro-ops 128 based on the frequency in which the corresponding instructions 116 are called, the selective instruction sequence buffer controller 114 may evict micro-ops 128 of less frequently-called instructions 116 to make room for capturing micro-ops 128 that are accessed more often. Thus, the micro-ops 128 of frequently-called instructions 116 can be provided by the ISB 144 instead of fetching and decoding such instructions 116. Therefore, capturing and providing the micro-ops 128 of frequently-called instructions 116 rather than consuming space in the ISB 144 with micro-ops 128 of less frequently-called instructions 116 enables the selective instruction sequence buffer controller 114 to reduce power consumption of the instruction processing system 100

In this regard, with continuing reference to FIG. 1, the selective instruction sequence buffer controller 114 is provided in the front end instruction stage 112 of the instruction processing system 100 in this example. The selective instruction sequence buffer controller 114 is configured to perform an exemplary process 200 in FIG. 2, which will now be described in conjunction with FIG. 1 to selectively store micro-ops 128 of previously decoded instructions 116 for execution in the instruction processing system 100.

Figure 2:
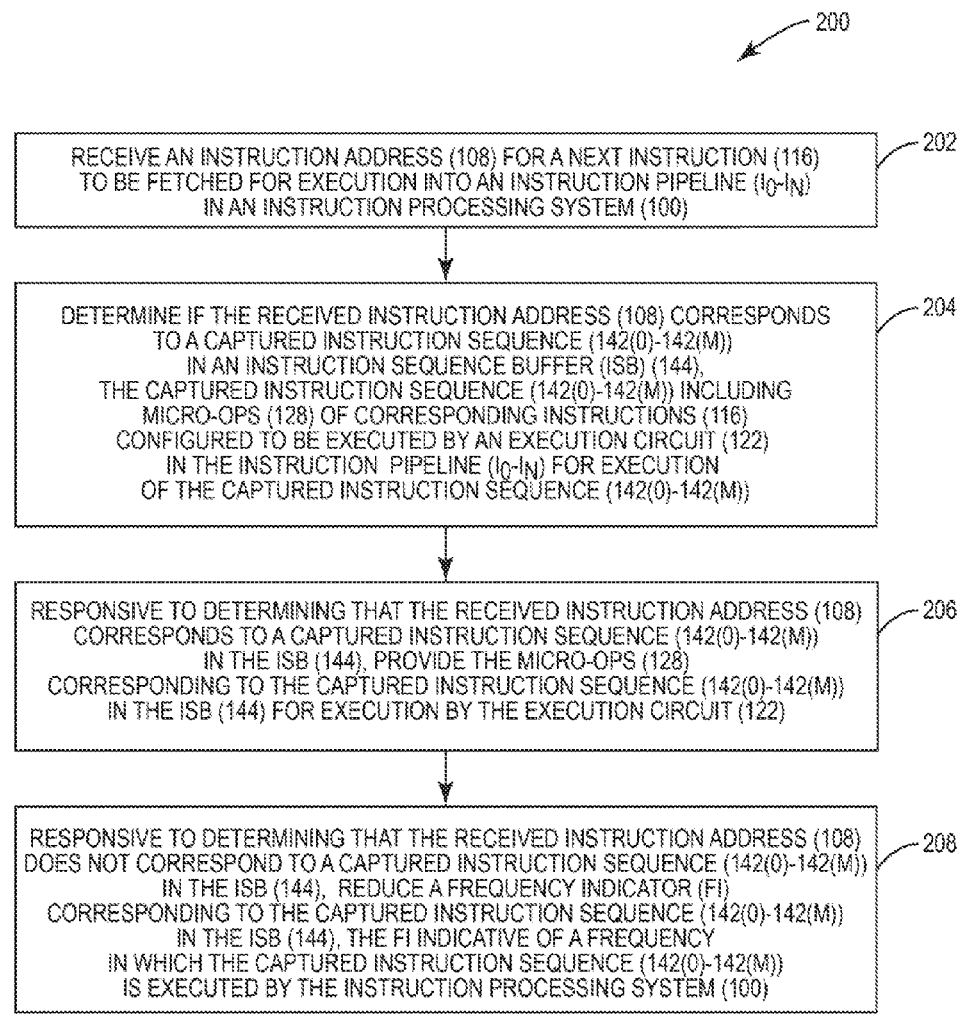
FIG. 2 is a flowchart illustrating an exemplary process of the selective instruction sequence buffer controller in FIG. 1 selectively storing micro-operations of frequently-called instruction sequences in the ISB based on information stored in the ISAT in FIG. 1.

In this regard, the selective instruction sequence buffer controller 114 is configured to receive the instruction address 108 for the next instruction 116 to be fetched for execution into one of the instruction pipelines $I_0$-$I_N$ in the instruction processing system 100 (block 202 in FIG. 2). The selective instruction sequence buffer controller 114 is further configured to determine if the received instruction address 108 corresponds to a captured instruction sequence 142(0)-142(M) in the ISB 144 (block 204 in FIG. 2). In this aspect, each captured instruction sequence 142(0)-142(M) can correspond to any sequence or section of instructions to be executed by a processor. For example, instructions which are commonly repeatedly fetched for execution in instruction loops, procedures/functions, and interrupt service routines are examples of instruction sequences. Note, however, that an instruction sequence can be any section or ordered instructions fetched for execution. The captured instruction sequence 142(0)-142(M) is made up of micro-ops 128 of corresponding instructions 116 that are configured to be executed by the execution circuit 122 in the instruction pipeline $I_0$-$I_N$ for execution of the captured instruction sequence 142(0)-142(M). Thus, each instruction 116 in the instruction sequence 142(0)-142(M) includes one or more micro-ops 128. As described in more detail below, in this aspect, the selective instruction sequence buffer controller 114 determines if the received instruction address 108 corresponds to a captured instruction sequence 142(0)-142(M) in the ISB 144 by searching entries $E_0$-$E_P$ of an instruction sequence address table (ISAT) 146 for the instruction address 108. The ISB 144 and the ISAT 146 are included in the front end instruction stage 112 in this aspect. Also as discussed in more detail below, to increase efficiency by storing the more frequently-called instruction sequences 142(0)-142(M), an instruction sequence 142(0)-142(M) may be captured (i.e., stored) in the ISB 144 once a frequency indicator (FI) within the entry $E_0$-$E_P$ in the ISAT 146 corresponding to the instruction sequence 142(0)-142(M) reaches a capture threshold. In this manner, the H is indicative of the frequency in which the instruction sequence 142(0)-142(M) is executed by the instruction processing system 100.

In response to the selective instruction sequence buffer controller 114 determining that the received instruction address 108 corresponds to the captured instruction sequence 142(0)-142(M) in the ISB 144, the selective instruction sequence buffer controller 114 is configured to provide the micro-ops 128 corresponding to the captured instruction sequence 142(0)-142(M) in the ISB 144 for execution by the execution circuit 122 (block 206 in FIG. 2). In this aspect, the ISB 144 provides the micro-ops 128 to a staging buffer 148 in the front end instruction stage 112 that is configured to provide the micro-ops 128 to the rename circuit 132 in the back end instruction stage 124. The staging buffer 148 is provided in this aspect so that the micro-ops 128 are provided to the rename circuit 132 at a point in time consistent with the expected timing of the instruction processing system 100. Further, as described in greater detail below, in addition to including data for each of the micro-ops 128, each entry $B_0$-$B_X$ in the ISB 144 includes a taken (T) and a not taken (NT) index. The taken (T) index points to a next micro-op 128 in response to a taken branch, and the not taken (NT) index points to the next micro-op 128 in response to a not taken branch. As illustrated in subsequent examples herein, including the taken (T) and the not taken (NT) indices in the ISB 144 provides a level of convergence control using the ISB 144. Further, as described in more detail below, the selective instruction sequence buffer controller 114 in this aspect is configured to communicate with a taken address table (TAT) 150 in the front end instruction stage 112, which enables the selective instruction sequence buffer controller 114 to merge multiple entries $B_0$-$B_X$ in the ISB 144 corresponding to a particular instruction 116 into one entry $B_0$-$B_X$ to achieve increased efficiency.

Additionally, because the ISB 144 has a limited capacity, the ISB 144 may not be able to store micro-ops 128 corresponding to each instruction 116. Thus, in response to the selective instruction sequence buffer controller 114 determining that the received instruction address 108 does not correspond to the captured instruction sequence 142(0)-142(M) in the ISB 144, the selective instruction sequence buffer controller 114 is configured to reduce the FI corresponding to the captured instruction sequence 142(0)-142(M) in the ISB 144 (block 208 in FIG. 2). As discussed in greater detail, an entry $B_0$-$B_X$ in the ISB 144 may be evicted from the ISB 144 when the H is reduced to a certain eviction threshold. In this manner, the ISB 144 is configured to store the micro-ops 128 corresponding to the more frequently-called instruction sequences 142(0)-142(M). When micro-ops 128 are provided from the ISB 144, the instruction fetch circuit 110 and the instruction decode circuit 126 may be disabled when corresponding instructions 116 are called. Thus, by storing and providing the micro-ops 128 of the more frequently-called instruction sequences 142(0)-142(M), the selective instruction sequence buffer controller 114 reduces power consumption of the instruction processing system 100.

To provide greater exemplary detail of how the selective instruction sequence buffer controller 114 can be configured to selectively store micro-ops 128 of the instructions 116 for execution in the instruction processing system 100, FIG. 3 illustrates an exemplary version of the ISAT 146 in FIG. 1. As discussed above, the ISAT 146 is configured to store information corresponding to instruction sequences 142(0)-142(M). For purposes of the following examples, each instruction sequence 142(0)-142(M) corresponds to an instruction loop (also referred to herein as each "instruction loop 142(0)-142(M)"). This means that each instruction loop 142(0)-142(M) in the following examples is a code structure that includes multiple instructions 116 at corresponding addresses that are executed repeatedly in a particular pattern for a particular number of iterations each time the instruction loop 142(0)-142(M) is called.

With continuing reference to FIG. 3, the ISAT 146 enables the training employed to store the micro-ops 128 of frequently-called instructions 116 referenced above by including a state (STATE) corresponding to each entry $E_0$-$E_P$. As discussed in greater detail below, such training is enabled by assigning a captured state (e.g., CAPTURED) to entries $E_0$-$E_P$ that are stored in the ISB 144 once the corresponding instruction loop 142(0)-142(M) has been called a certain number of times. Further, a state of invalid (e.g., INVALID) can be assigned to entries $E_0$-$E_P$ that may be evicted from the ISB 144 in response to the corresponding instruction loop 142(0)-142(M) not being called frequently enough to justify storing the micro-ops 128 in ISB 144.

With continuing reference to FIG. 3, in this aspect, the ISAT 146 includes multiple columns 146C(0)-146C(7) that each contain particular information corresponding to an instruction loop 142(0)-142(M). For example, column 146C(0) includes an instruction sequence target address (IS TGT ADDR) corresponding to a virtual address of a target of a backwards-taken branch instruction that signifies the first instruction 116 of an instruction loop 142(0)-142(M). Thus, entries $E_0$, $E_1$, and $E_P$ of the ISAT 146 correspond to the instruction loops 142(0)-142(M) whose backwards-taken branch instructions access the addresses 0x4010, 0x5000, and 0xebb0, respectively. Further, column 146C(1) includes an instruction sequence branch address (IS BR ADDR) corresponding to a virtual address of the backwards-taken branch instruction of an instruction loop 142(0)-142(M). In this manner, entries $E_0$, $E_1$, and $E_P$ of the ISAT 146 correspond to instruction loops 142(0)-142(M) whose virtual address to the backwards-taken branch instruction is equal to 0x4060, 0x5040, and 0xec00, respectively.

With continuing reference to FIG. 3, the ISAT 146 also includes column 146C(2) that stores a count (COUNT) indicating a number of iterations in which the instruction loop 142(0)-142(M) is executed each time the instruction loop 142(0)-142(M) is encountered. The selective instruction sequence buffer controller 114 may train and capture instruction loops 142(0)-142(M) without use of the COUNT, and thus, some aspects may not include the COUNT so as to save area consumed by the ISAT 146. In this example, the instruction loops 142(0)-142(M) corresponding to the entries $E_0$, $E_1$, and $E_P$ will be executed a total of 2,162, 501, and 18,048 iterations, respectively, each time the corresponding instruction loops 142(0)-142(M) are encountered. Additionally, column 146C(3) includes an optional bit vector (UB ENTRIES) that stores information about the entries $B_0$-$B_X$ in the ISB 144 that correspond to the instruction loop 142(0)-142(M) corresponding to each entry $E_0$-$E_P$. For example, the instruction loop 142(0)-142(M) corresponding to the entry $E_0$ has micro-ops 128 stored in the ISB 144 in 0xF0 entries. Column 146C(4) includes a start index (START INDEX) indicative of the location in the ISB 144 in which the captured instruction loop 142(0)-142(M) begins. The ISAT 146 also includes column 146C(6) that stores a branch profile (BRANCH PROFILE) that indicates which, if any, micro-ops 128 in the corresponding instruction loop 142(0)-142(M) include a branch instruction. In this manner, the selective instruction sequence buffer controller 114 may be configured to selectively activate the control flow prediction circuit 130 (also referred to as a branch prediction circuit) in FIG. 1. Selectively activating the control flow prediction circuit 130 in FIG. 1, as opposed to processing a prediction each cycle, may reduce power consumption of the instruction processing system 100 in FIG. 1.

With continuing reference to FIG. 3, as referenced above, the selective instruction sequence buffer controller 114 determines if the received instruction address 108 corresponds to a captured instruction loop 142(0)-142(M) in the ISB 144 by searching the entries $E_0$-$E_P$. In this manner, the ISAT 146 is configured to support training such that instruction loops 142(0)-142(M) have an associated state (STATE) in column 146C(5) that indicates whether the corresponding micro-ops 128 are stored in the ISB 144. For example, the entry $E_0$ in the ISAT 146 has a state of captured (e.g., CAPTURED), indicating that the micro-ops 128 corresponding to the instruction loop 142(0)-142(M) are stored in the ISB 144. Additionally, the entry $E_1$ in the ISAT 146 has a state of training (e.g., TRAINING), indicating that the micro-ops 128 of the corresponding instruction loops 142 (0)-142(M) are not yet stored in the ISB 144, but may be stored in the future if the FI (SCORE) in column 146C(7) reaches a capture threshold. As described in more detail below, training in the ISAT 146 includes increasing (e.g., incrementing) the SCORE corresponding to an entry $E_0$-$E_P$ in response to the instruction loop 142(0)-142(M) being accessed by the instruction processing system 100. If the SCORE reaches a capture threshold, then the micro-ops 128 corresponding to the instruction loop 142(0)-142(M) are stored in the ISB144.

Further, also as discussed in more detail below, training includes reducing (e.g., decrementing) the SCORE corresponding to an entry $E_0$-$E_P$ when an instruction loop 142 (0)-142(M) not yet stored in the ISB 144 is detected, but there is no capacity in which to store the instruction loop 142(0)-142(M) in the ISB 144. In response to the SCORE of an entry $E_0$-$E_P$ reaching an eviction threshold, the state of the corresponding entry $E_0$-$E_P$ may be set to invalid (e.g., INVALID). Further, the state of the corresponding entry $E_0$-$E_P$ may be set to overwritten (e.g., OVERWRITTEN) in response to corresponding entries $B_0$-$B_X$ in the ISB 144 being altered. In this manner, instruction loops 142(0)-142 (M) that do not have a corresponding entry $E_0$-$E_P$ in the ISAT 146, and instruction loops 142(0)-142(M) that have a state of training, invalid, or overwritten, are not captured (e.g., stored) in the ISB 144. Thus, such instruction loops 142(0)-142(M) may also be referred to as non-captured instruction loops 142(0)-142(M) (or as "non-captured instruction sequences 142(0)-142(M)" in examples that include code structures other than instructions loops).

To provide further details of how the selective instruction sequence buffer controller 114 can be configured to selectively store micro-ops 128 for execution in the instruction processing system 100, FIG. 4 illustrates an exemplary version of the ISB 144 in FIG. 1. The ISB 144 includes the micro-ops 128 in column 144C(0), as well as the taken (T) and not taken (NT) indices corresponding to the micro-ops 128 in columns 144C(1) and 144C(2), respectively. In this manner, entry $B_0$ of the ISB 144 includes information related to the micro-ops 128 corresponding to the instruction address 108 0x8640. For example, column 144C(0) includes the micro-op data (UOP DATA) that makes up the micro-ops 128. The UOP DATA in this example may be 5×128×68 bits. Further, column 144C(1) includes no value for the taken (T) index, which represents that the micro-ops 128 do not correspond to a taken branch instruction. However, column 144C(2) includes a "1" for the not taken (NT) index, which represents that the micro-ops 128 correspond to a branch instruction that, when not taken, accesses the entry $B_1$ in the ISB 144 (e.g., the entry having an index "1" in the ISB 144).

Figure 5A:
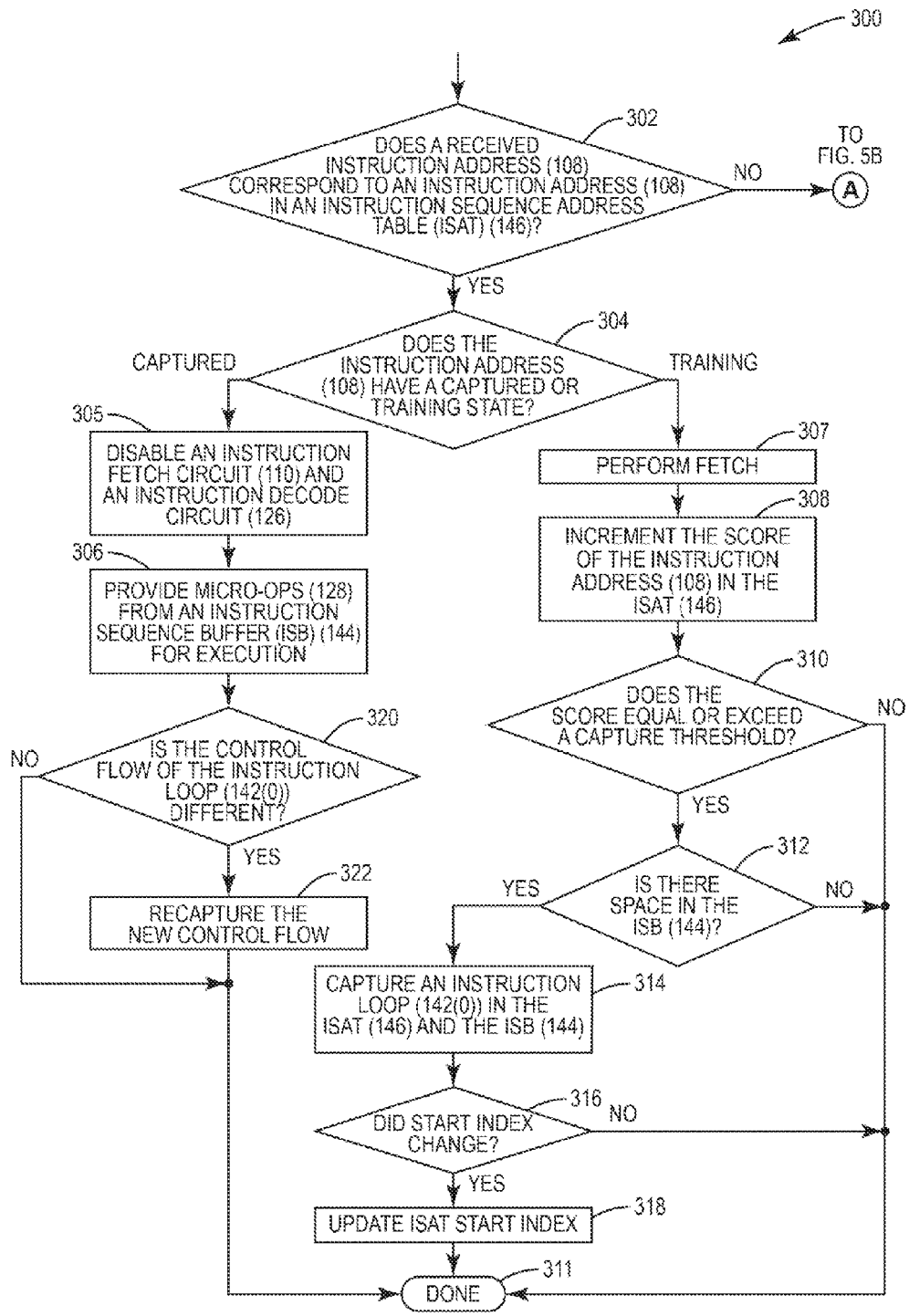
FIGS. 5A and 5B are a flowchart illustrating another exemplary process of the selective instruction sequence buffer controller in FIG. 1 selectively storing and providing micro-operations of frequently-called instruction sequences in the ISB based on information stored in the ISAT in FIG. 1.
Figure 5B:
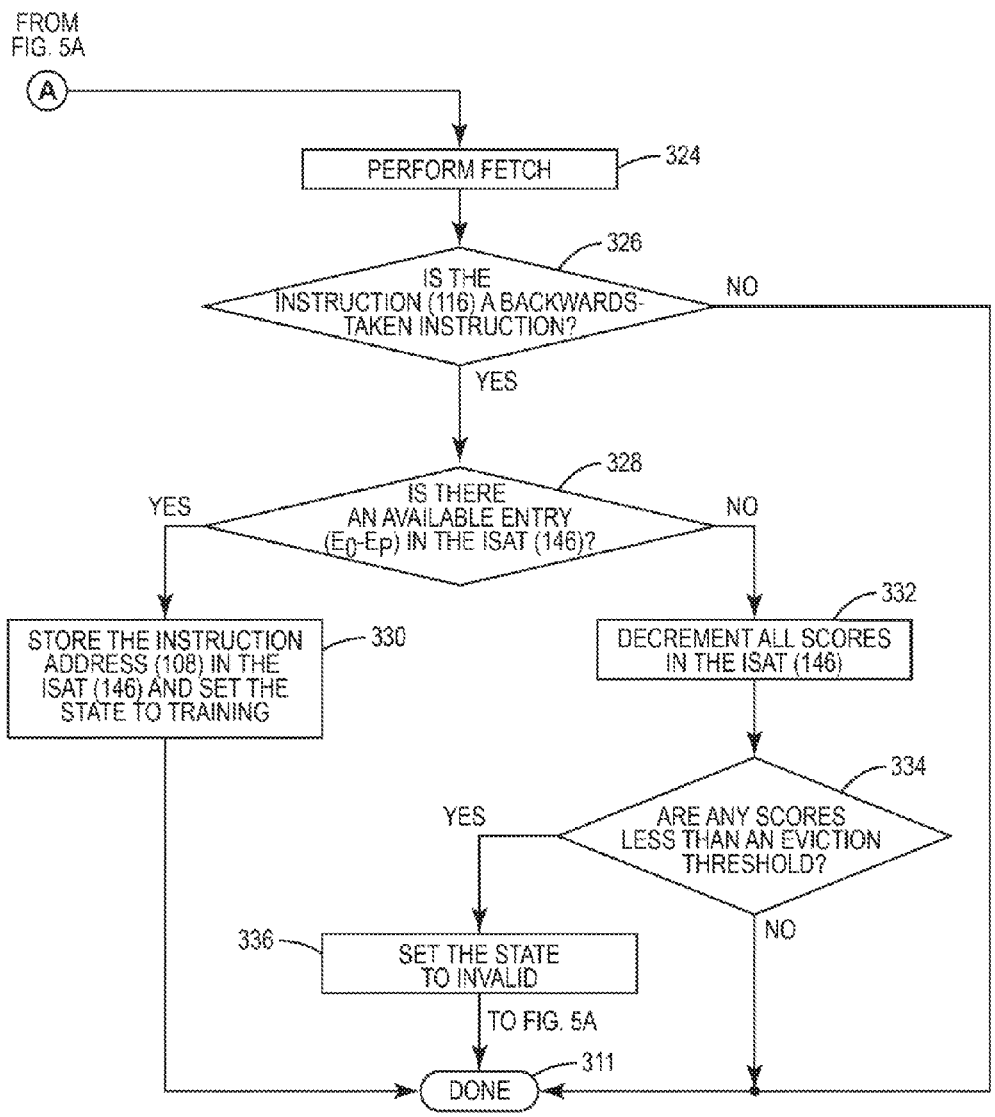
Figure 6A:
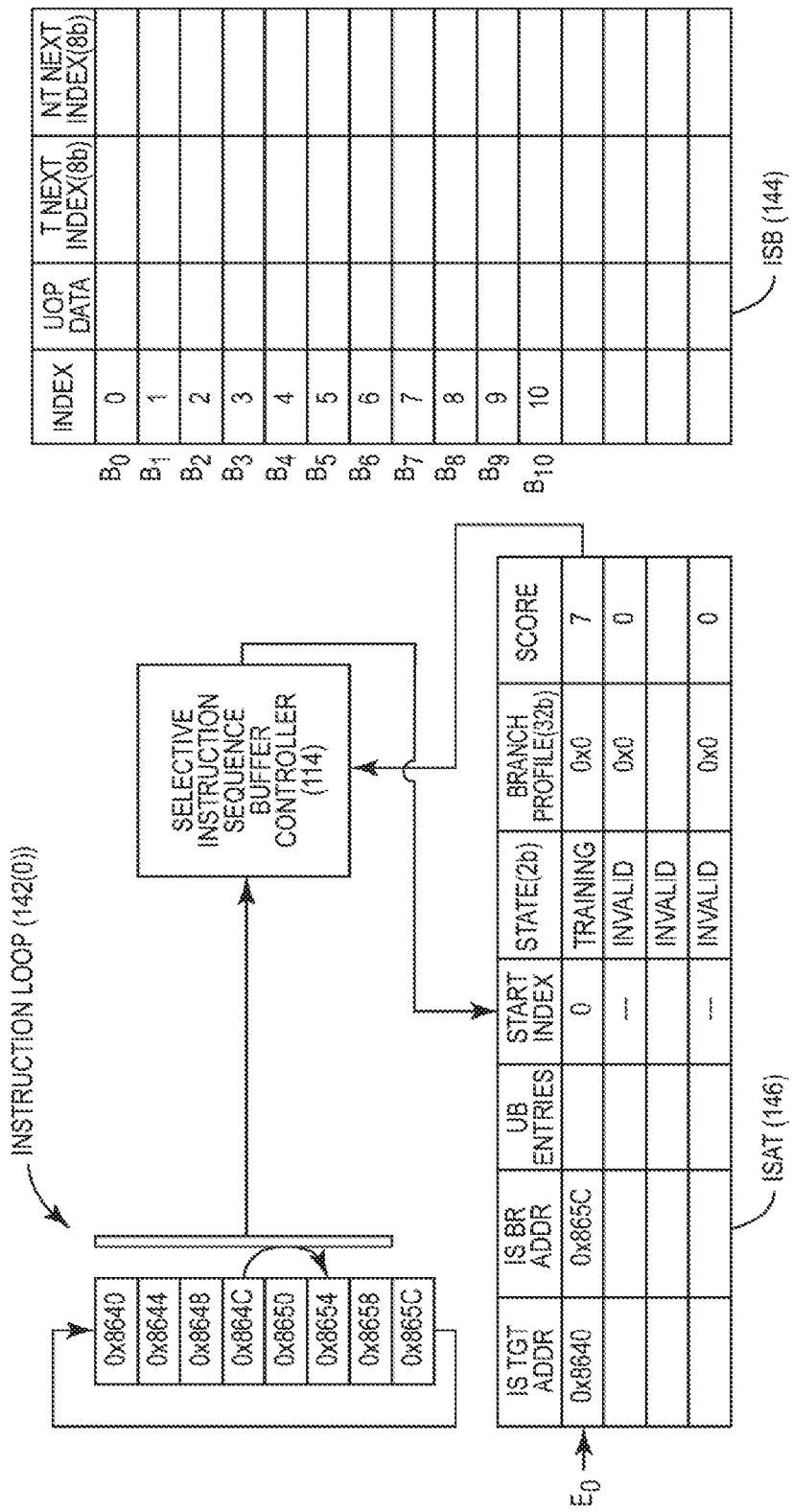
FIGS. 6A-6Q are diagrams illustrating various states of the ISAT and the ISB controlled by the selective instruction sequence buffer controller in FIG. 1 during exemplary operation.
Figure 6B:
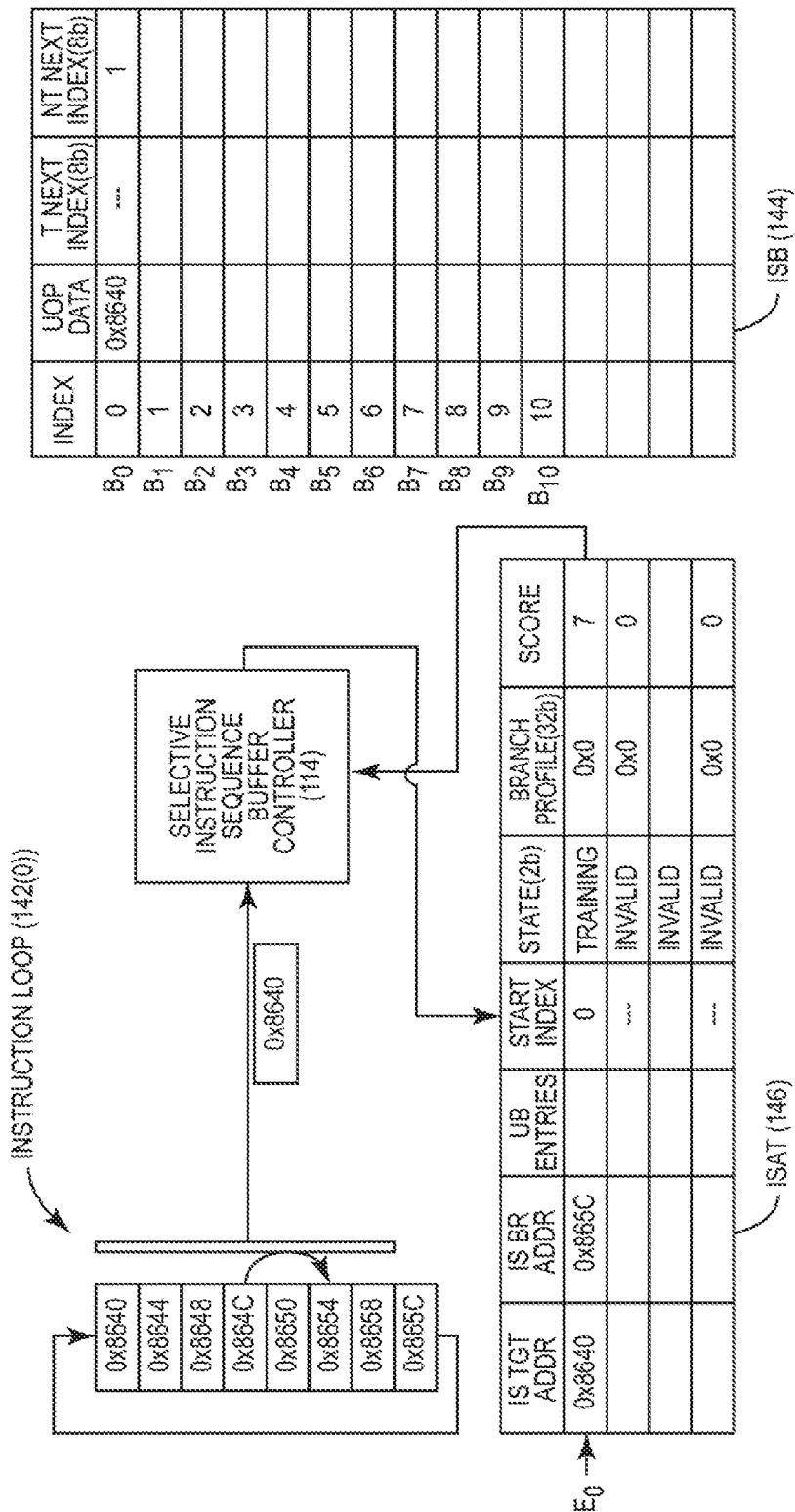
Figure 6C:
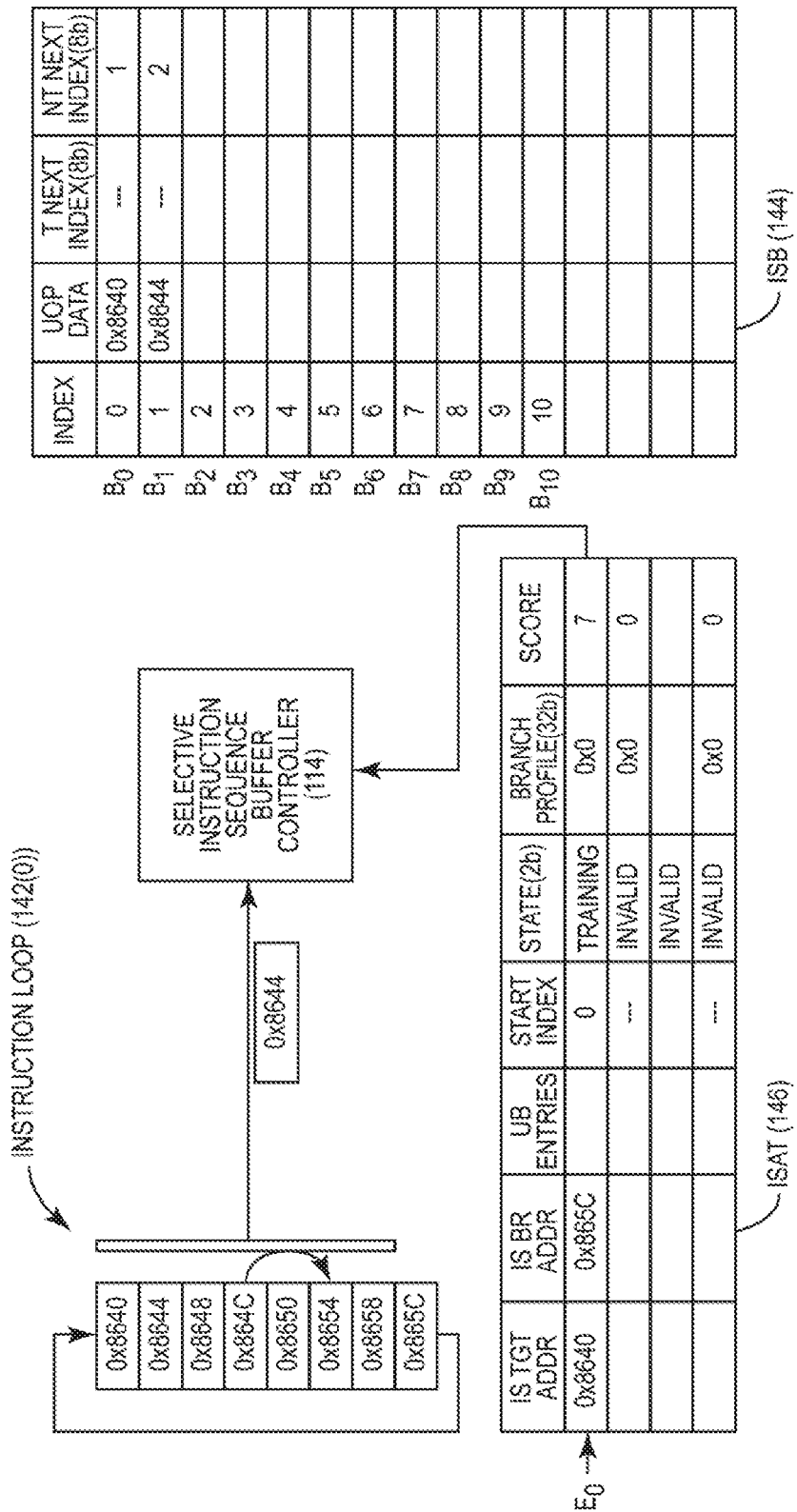
Figure 6D:
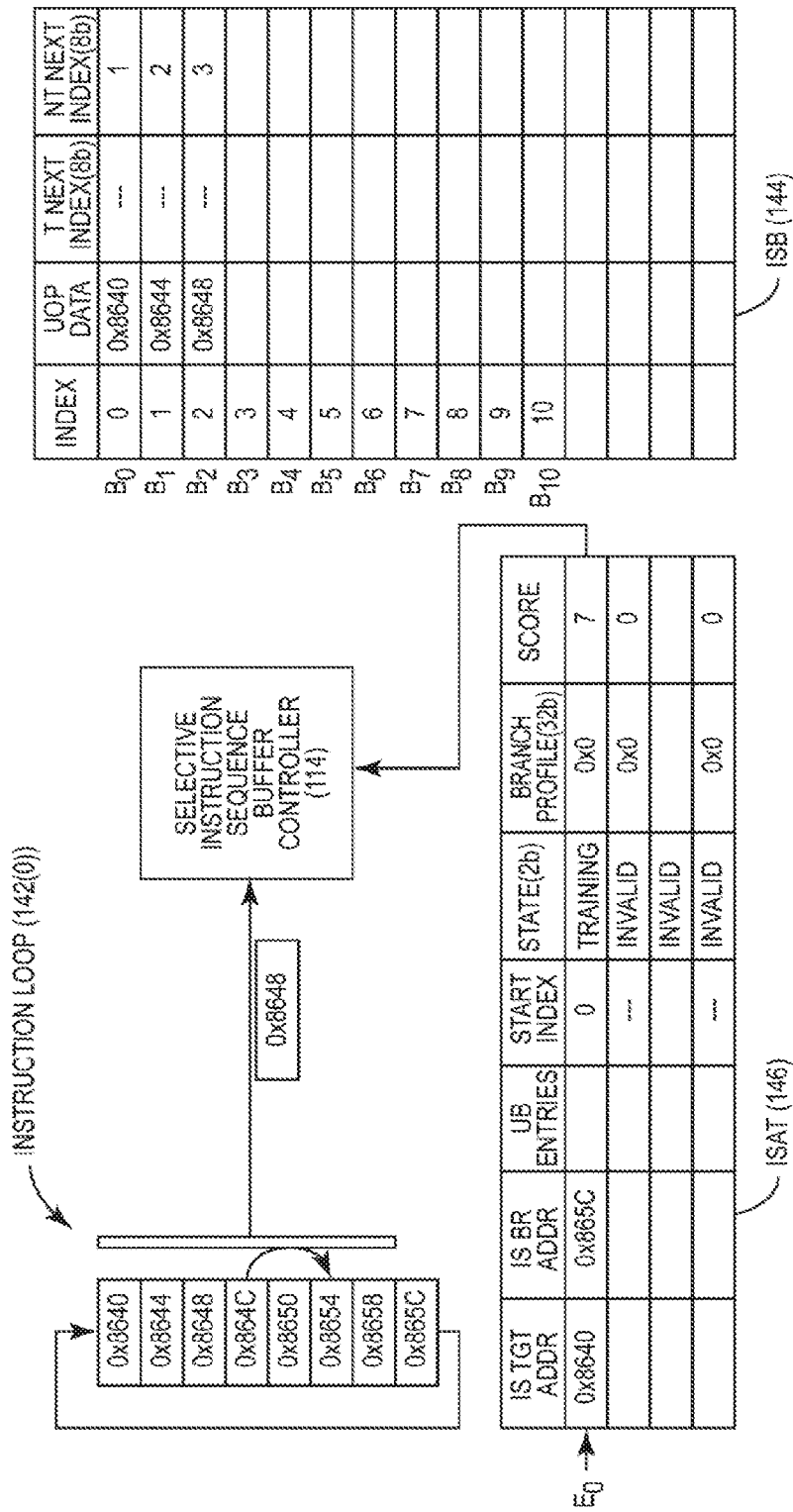

In addition to the example provided above in relation to the process 200 in FIG. 2, the selective instruction sequence buffer controller 114 may be configured take additional information into account and take further steps when training, capturing, and evicting micro-ops 128 stored in the ISB 144. The additional information and steps processed by the selective instruction sequence buffer controller 114 can provide more detailed training such that the instruction loops 142(0)-142(M) stored in the ISB 144 allow the instruction processing system 100 to operate more efficiently. In this manner, FIGS. 5A and 5B illustrate an exemplary process 300 which may be executed by the selective instruction sequence buffer controller 114 to selectively store micro-ops 128 for execution in the instruction processing system 100. The process 300 in FIGS. 5A and 5B will be described in conjunction with diagrams in FIGS. 6A-6Q illustrating contents of the ISB 144 and the ISAT 146 during various steps of the process 300. The ISAT 146 in FIGS. 6A-6Q does not include column 146C(2) corresponding to COUNT, as shown in FIG. 3.

In this regard, in response to receiving an instruction address 108, the selective instruction sequence buffer controller 114 determines if the received instruction address 108 0x8640 corresponds to an instruction address 108 stored in an entry $E_0$-$E_P$ of the ISAT 146 (block 302 in FIG. 5A). With reference to FIG. 6A, the instruction address 108 0x8640 corresponding to the start of the instruction loop 142(0) is stored in entry $E_0$ of the ISAT 146. In response to the instruction address 108 0x8640 being stored in the ISAT 146, the selective instruction sequence buffer controller 114 determines if the instruction address 108 0x8640 has a state of captured (e.g., CAPTURED) or training (e.g., TRAINING) (block 304 in FIG. 5A). If the instruction address 108 0x8640 has a state of captured, the selective instruction sequence buffer controller 114 disables the instruction fetch circuit 110 and the instruction decode circuit 126 (block 305 in FIG. 5A). The selective instruction sequence buffer controller 114 also provides the micro-ops 128 from the ISB 144 for execution in the instruction processing system 100 (block 306 in FIG. 5A). In some aspects, in response to providing the micro-ops 128 from the ISB 144 in block 306, the selective instruction sequence buffer controller 114 increments the FI (SCORE) in the ISAT 146 corresponding to the instruction address 108. However, with reference to FIG. 6A, the instruction address 108 0x8640 does not have a captured state, but rather, has a training state (e.g., TRAINING). In response to the instruction address 108 0x8640 having a training state (e.g., TRAINING), the selective instruction sequence buffer controller 114 instructs the instruction fetch circuit 110 in FIG. 1 to perform a fetch (block 307 in FIG. 5A). Further, the selective instruction sequence buffer controller 114 increases (e.g., increments) the FI (SCORE) from 6 to 7 in entry $E_0$ (block 308 in FIG. 5A).

After the FI (SCORE) in entry $E_0$ is incremented, the selective instruction sequence buffer controller 114 determines if the FI (SCORE) in entry $E_0$ is greater than or equal to a capture threshold, which is equal to 7 in this example (block 310 in FIG. 5A). If the FI (SCORE) in entry $E_0$ is less than the capture threshold, the selective instruction sequence buffer controller 114 is done with the iteration corresponding to the instruction address 108 (block 311 in FIG. 5A). However, if the FI (SCORE) is greater than or equal to the capture threshold, the selective instruction sequence buffer controller 114 determines if the ISB 144 has enough free space to store the micro-ops 128 of the instruction loop 142(0) (block 312 in FIG. 5A). In some aspects, determining if the ISB 144 has enough free space includes determining if a free list (not shown) indicates that the ISB 144 has enough free entries $B_0$-$B_X$. If the ISB 144 does not have enough free space, the selective instruction sequence buffer controller 114 is done with the iteration corresponding to the instruction address 108 in block 311. However, if the ISB 144 does have enough free space, the selective instruction sequence buffer controller 114 captures the micro-ops 128 of the instruction loop 142(0) in the ISB 144 and the ISAT 146 (block 314 in FIG. 5A).

To capture the micro-ops 128 in the ISB 144, the selective instruction sequence buffer controller 114 stores the micro-ops 128 corresponding to each instruction address 108 of each instruction 116 in the instruction loop 142(0). For example, FIG. 6B illustrates the selective instruction sequence buffer controller 114 storing the micro-ops 128 corresponding to the instruction address 108 0x8640 in entry $B_0$ (e.g., Index 0) of the ISB 144. In this manner, the selective instruction sequence buffer controller 114 stores the micro-ops 128 (UOP DATA). The selective instruction sequence buffer controller 114 does not store a value in the taken (T) index, as the instruction address 108 0x8640 does not correspond to a taken branch instruction. However, the selective instruction sequence buffer controller 114 stores a 1 in the not taken (NT) index so that the next set of micro-ops 128 provided correspond to the entry $B_1$ (e.g., Index 1) in the ISB 144. Similarly, FIG. 6C illustrates the selective instruction sequence buffer controller 114 storing the micro-ops 128 corresponding to the instruction address 108 0x8644 in entry $B_1$ (e.g., Index 1) of the ISB 144, with a taken (T) index of no value and a not taken (NT) index of 2, for similar reasons as previously described. FIG. 6D illustrates the selective instruction sequence buffer controller 114 storing the micro-ops 128 corresponding to the instruction address 108 0x8648 in entry $B_2$ (e.g., Index 2) of ISB 144, with a taken (T) index of no value and a not taken (NT) index of 3, for similar reasons as previously described.

Figure 6E:
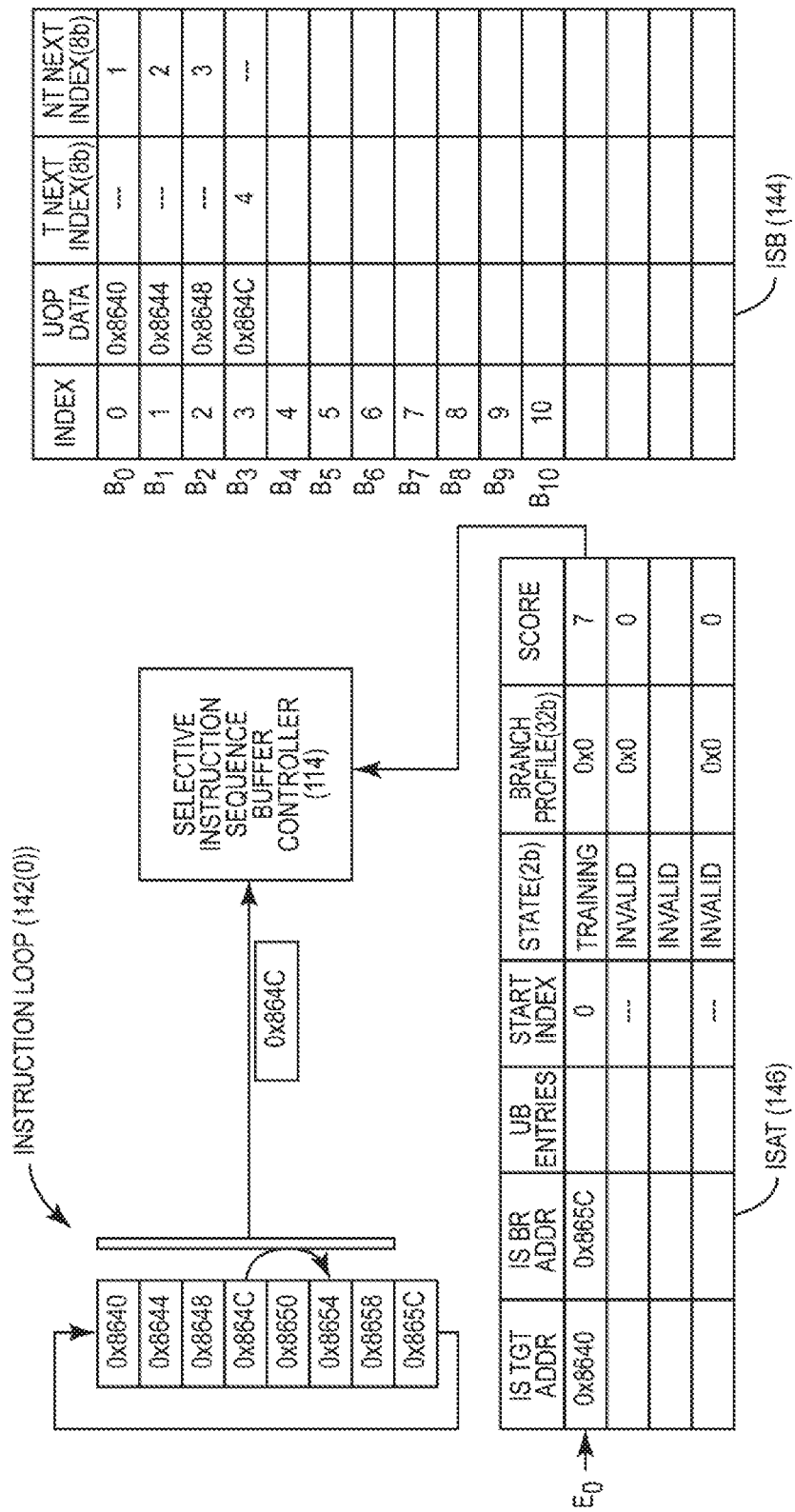
Figure 6F:
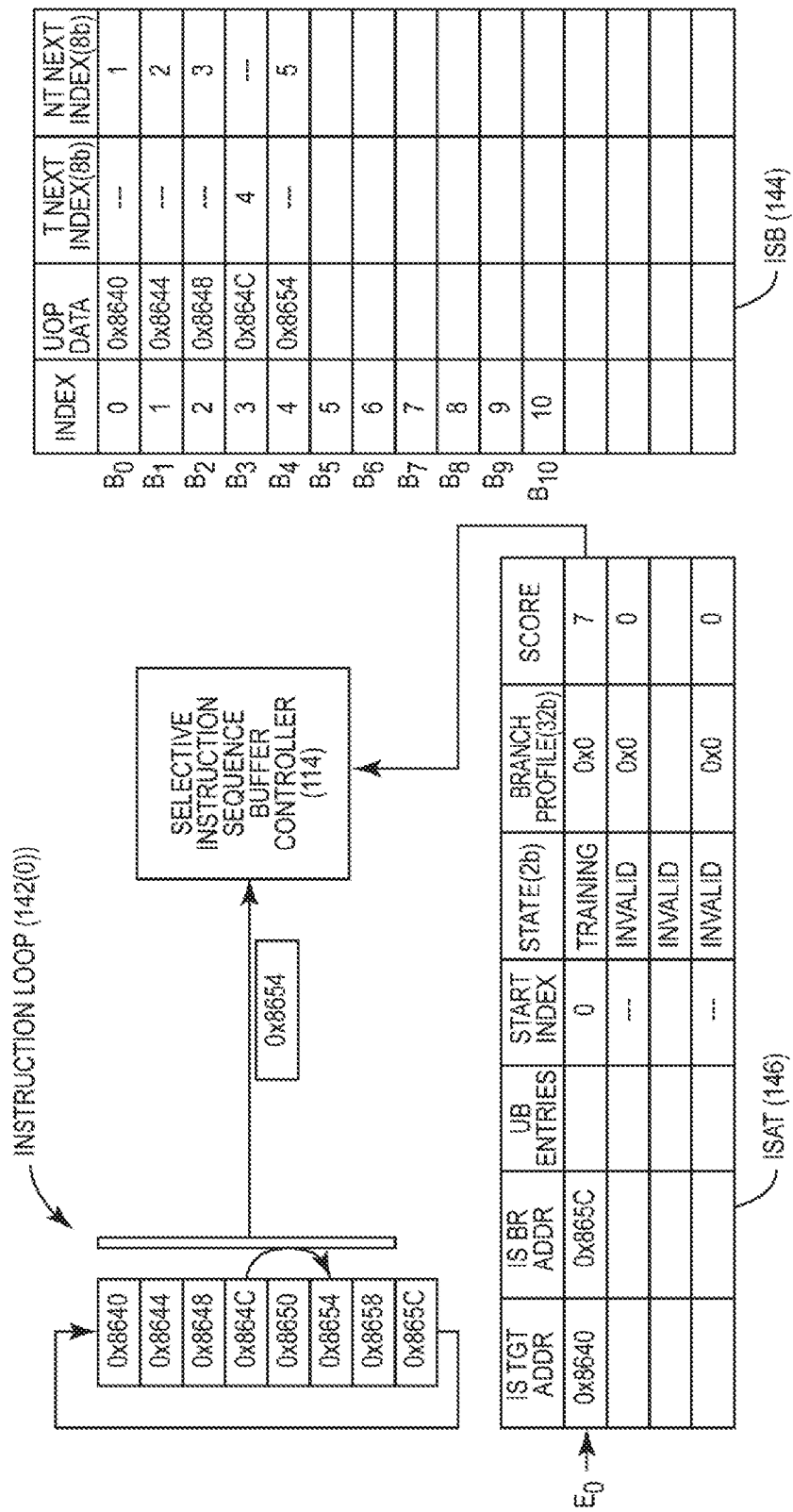
Figure 6G:
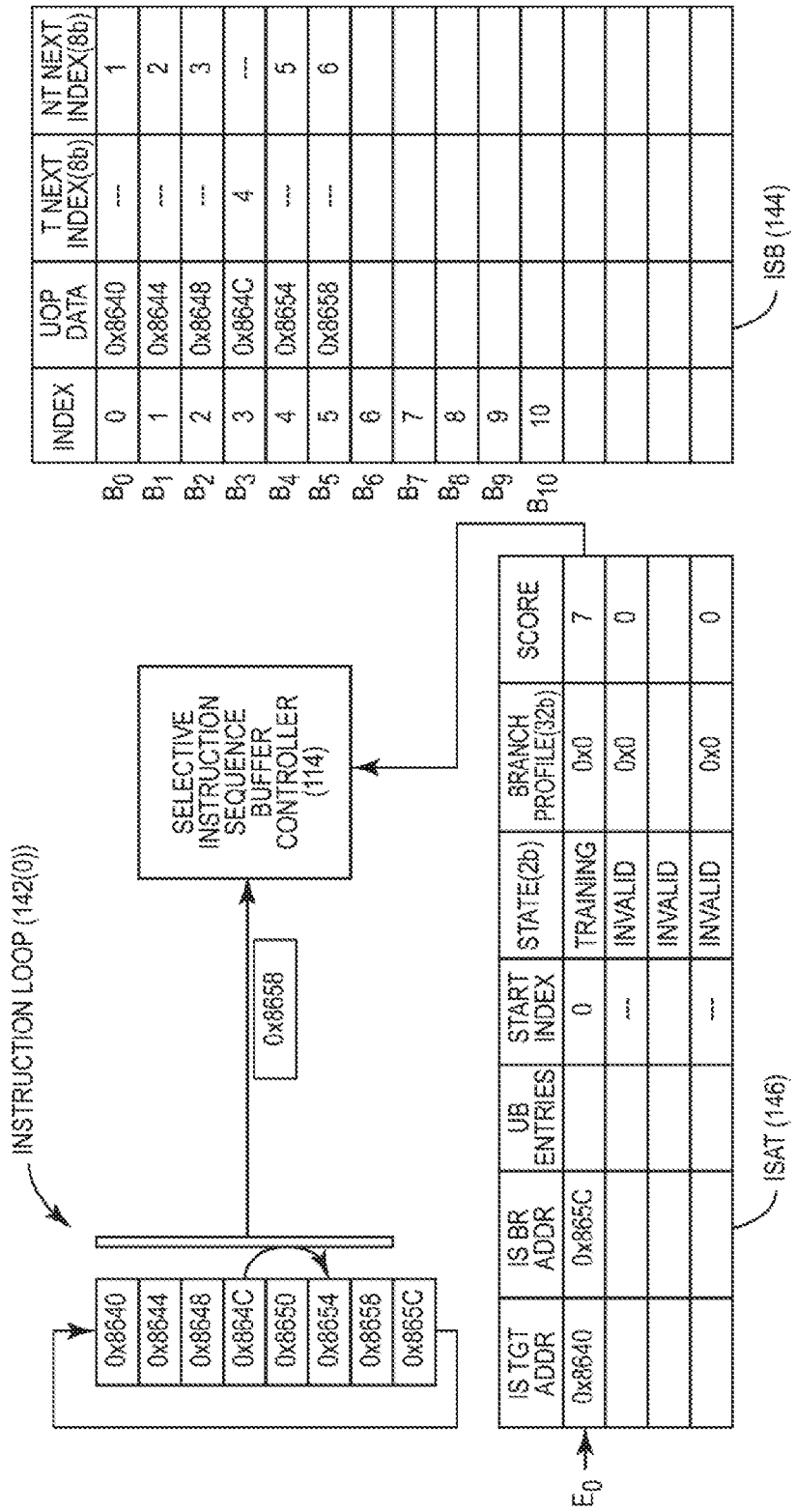
Figure 6H:
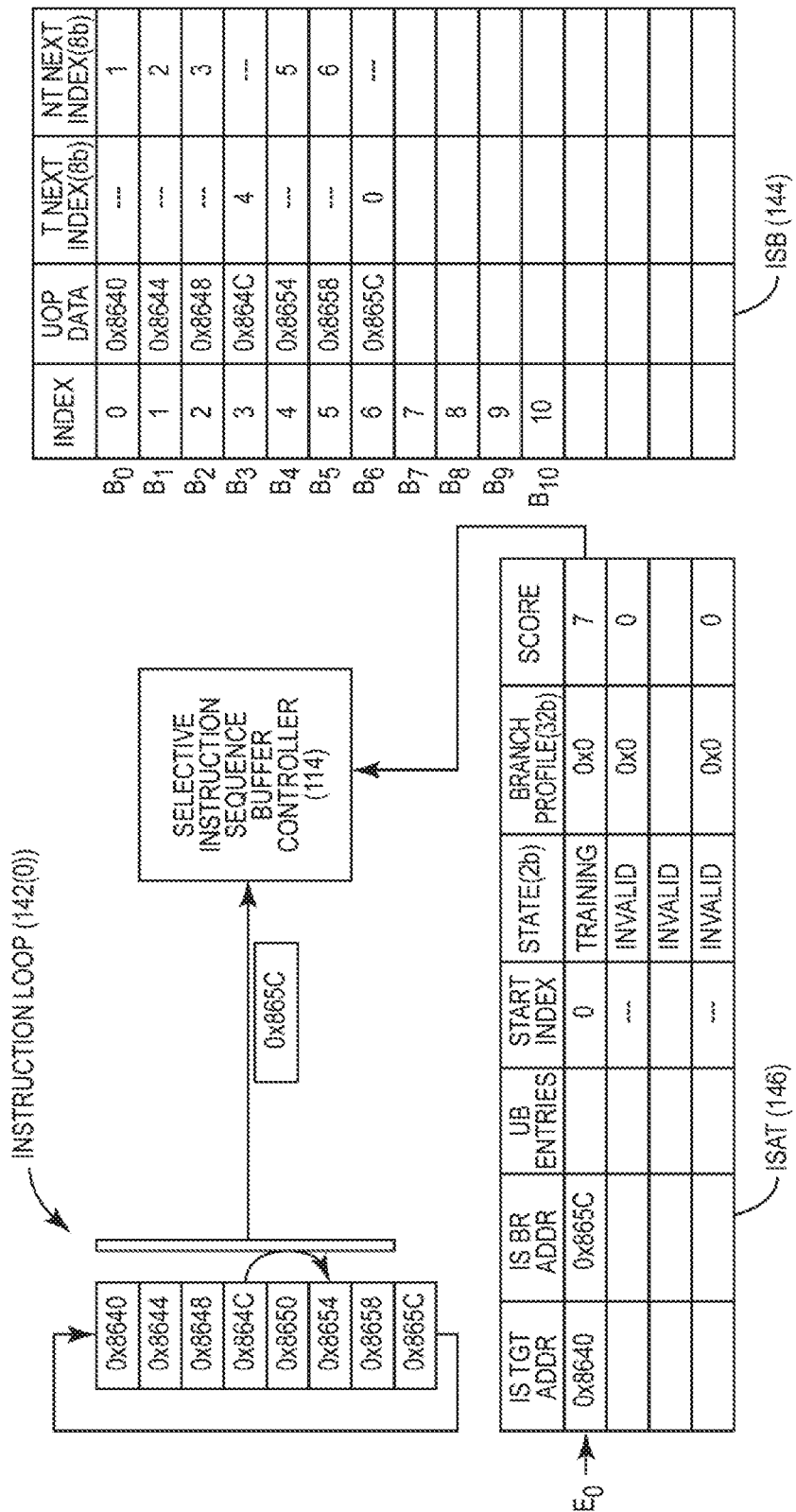
Figure 6I:
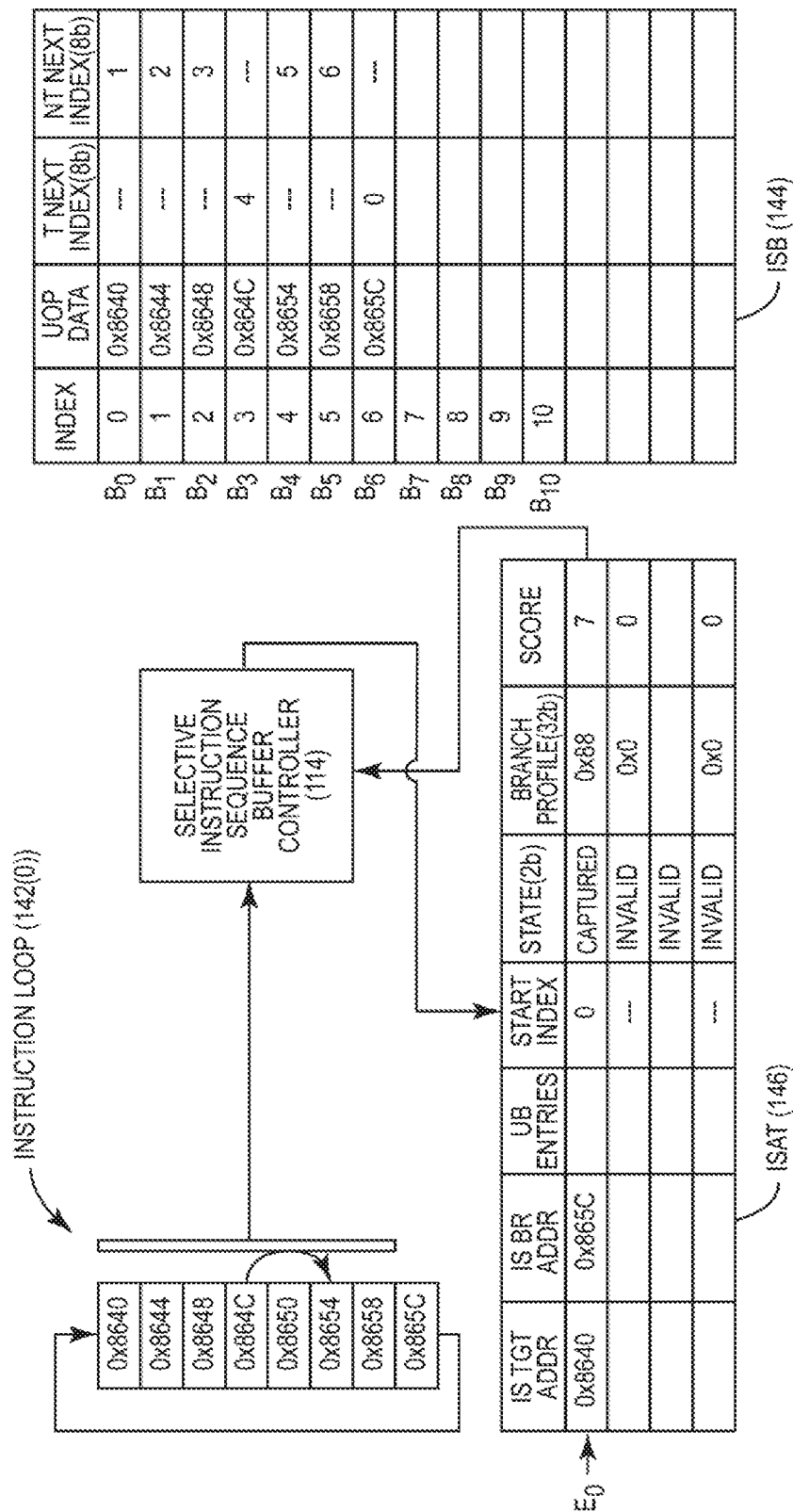

FIG. 6E illustrates the selective instruction sequence buffer controller 114 storing the micro-ops 128 corresponding to the instruction address 108 0x864C in entry $B_3$ (e.g., Index 3) of the ISB 144, with a taken (T) index of 4 and a not taken (NT) index of no value. Unlike the previous entries $B_0$-$B_2$, the taken (T) index of 4 represents that the instruction 116 at the instruction address 108 0x864C is a taken branch instruction in which the next set of micro-ops 128 provided correspond to the entry $B_4$ (e.g., Index 4) in the ISB 144. Further, FIG. 6F illustrates the selective instruction sequence buffer controller 114 storing the micro-ops 128 corresponding to the instruction address 108 0x8654 in entry $B_4$ (e.g., Index 4) of the ISB 144, with a taken (T) index of no value and a not taken (NT) index of 5, for similar reasons as previously described. FIG. 6G illustrates the selective instruction sequence buffer controller 114 storing the micro-ops 128 corresponding to the instruction address 108 0x8658 in entry $B_5$ (e.g., Index 5) of the ISB 144, with a taken (T) index of no value and a not taken (NT) index of 6, for similar reasons as previously described. Further, FIG. 6H illustrates the selective instruction sequence buffer controller 114 storing the micro-ops 128 corresponding to the instruction address 108 0x865C in entry $B_6$ (e.g., Index 6) of the ISB 144, with a taken (T) index of 0 and a not taken (NT) index of no value. Notably, because the taken (T) index of entry $B_6$ is equal to 0, the selective instruction sequence buffer controller 114 determines that the instruction loop 142(0) has completed an iteration, because the instruction address 108 0x865C indicates a backwards-taken branch instruction to the first entry $B_0$ of the instruction loop 142(0) (e.g., Index 0). Reaching the backwards-taken branch instruction is indicative that the instruction loop 142(0) is captured or stored in the ISB 144, and thus, the state of entry $E_0$ in the ISAT 146 may be changed to captured, as illustrated in FIG. 6I. Further, the branch profile in entry $E_0$ of the ISAT 146 is also updated accordingly to 0x88.

Additionally, once the instruction loop 142(0) is captured in this manner, the selective instruction sequence buffer controller 114 determines if the START INDEX in the entry $E_0$ of the ISAT 146 changed as a result of the capture to the ISB 144 (block 316 in FIG. 5A). If the START INDEX changed, the selective instruction sequence buffer controller 114 updates the corresponding START INDEX in the ISAT 146, and is done with the iteration corresponding to the instruction address 108 in block 311 (block 318 in FIG. 5A). Otherwise, the selective instruction sequence buffer controller 114 does not update the START INDEX and is done with the iteration corresponding to the instruction address 108 in block 311.

Figure 6J:
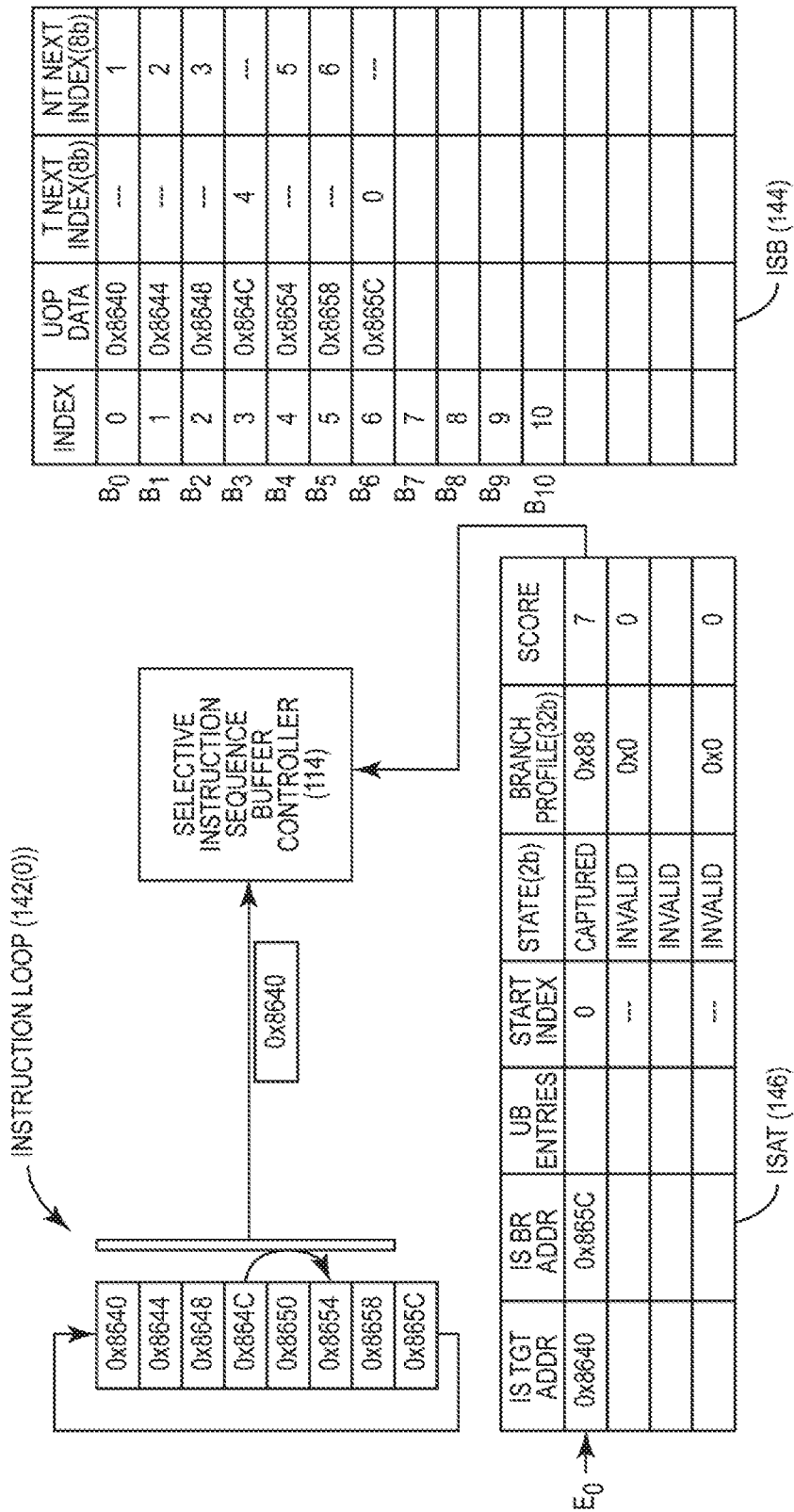

When the instruction address 108 0x8640 is next accessed by the instruction processing system 100, the selective instruction sequence buffer controller 114 determines that the instruction address 108 is in the ISAT 146 (block 302 in FIG. 5A) and has a captured state (block 304 in FIG. 5A). Thus, the selective instruction sequence buffer controller 114 provides the micro-ops 128 (block 306 in FIG. 5A). However, in response to providing the micro-ops 128, the selective instruction sequence buffer controller 114 checks as to whether the control flow of the instruction loop 142(0) is the same control flow as previously captured (block 320 in FIG. 5A). If the control flow of the instruction loop 142(0) is the same as the control flow previously captured, the selective instruction sequence buffer controller 114 is done with the iteration corresponding to the instruction address 108 in block 311. If the control flow is different, the selective instruction sequence buffer controller 114 re-captures the instruction loop 142(0) with the additional control flow and is done with the iteration corresponding to the instruction address 108 in block 311 (block 322 in FIG. 5A). In this manner, FIG. 6J illustrates that the selective instruction sequence buffer controller 114 storing the micro-ops 128 corresponding to the instruction addresses 108 0x8640, 0x8644, and 0x8648 in entries $B_0$-$B_2$ of the ISB 144 as previously described.

Figure 6K:
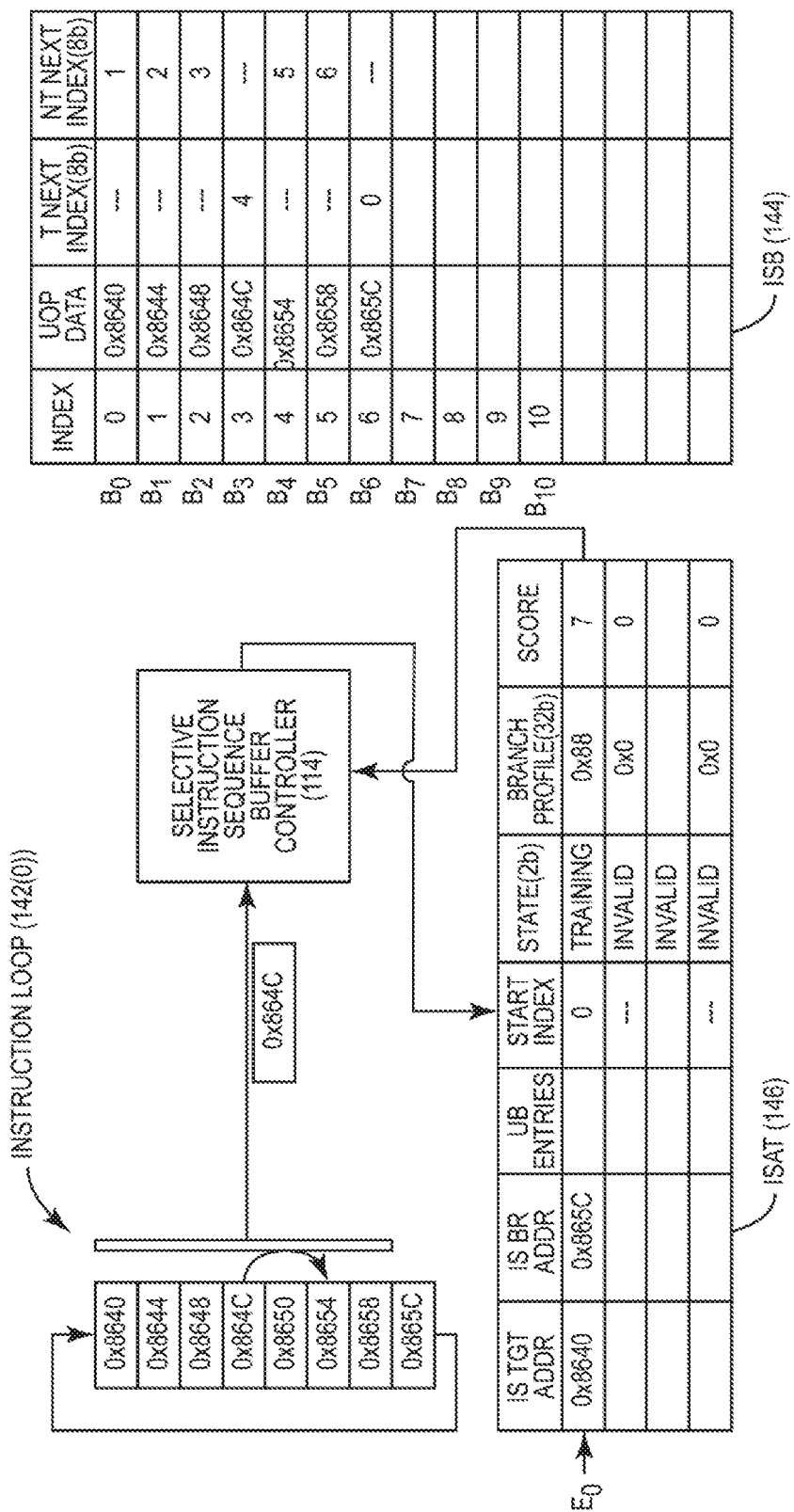
Figure 6L:
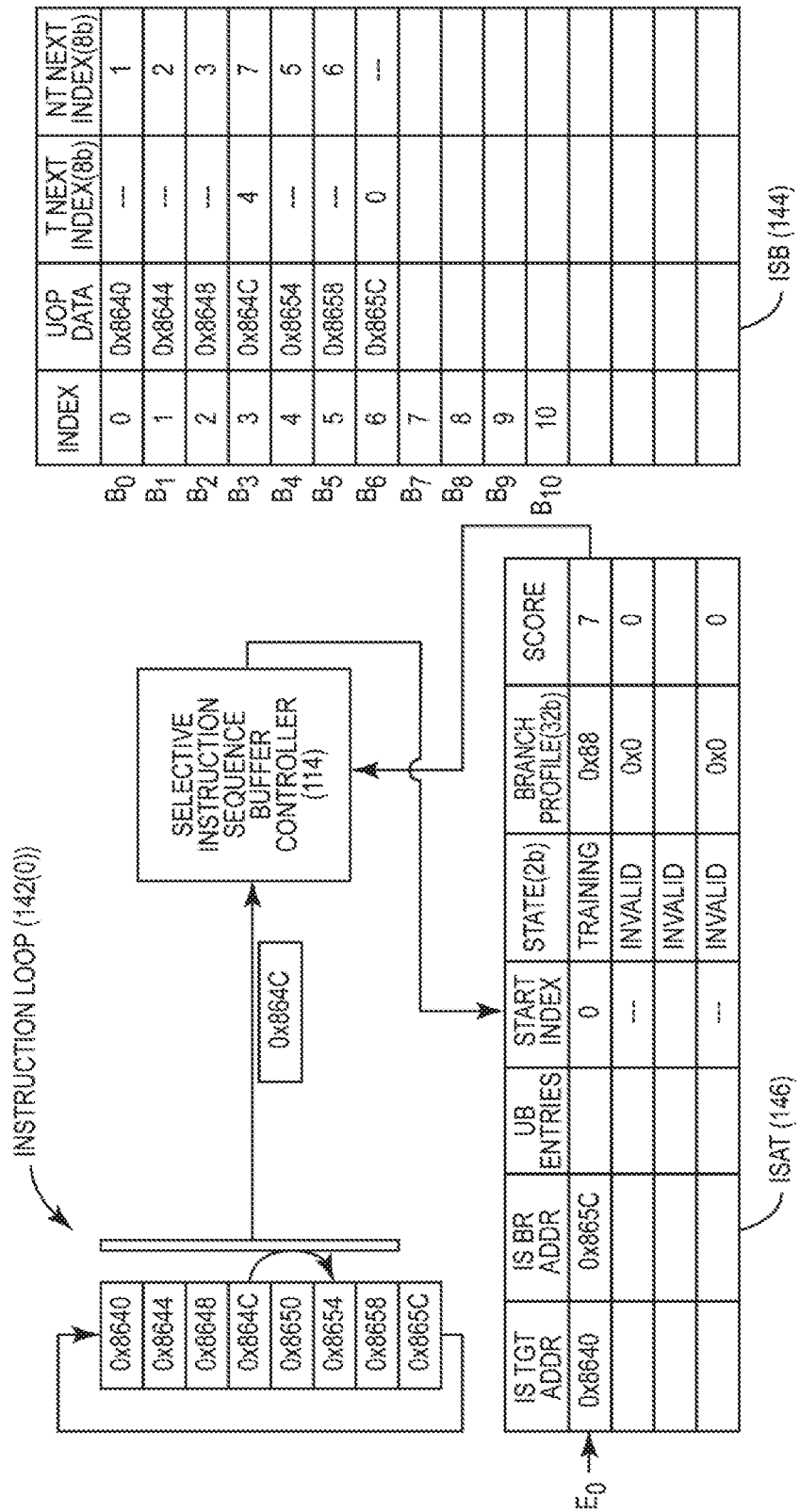
Figure 6M:
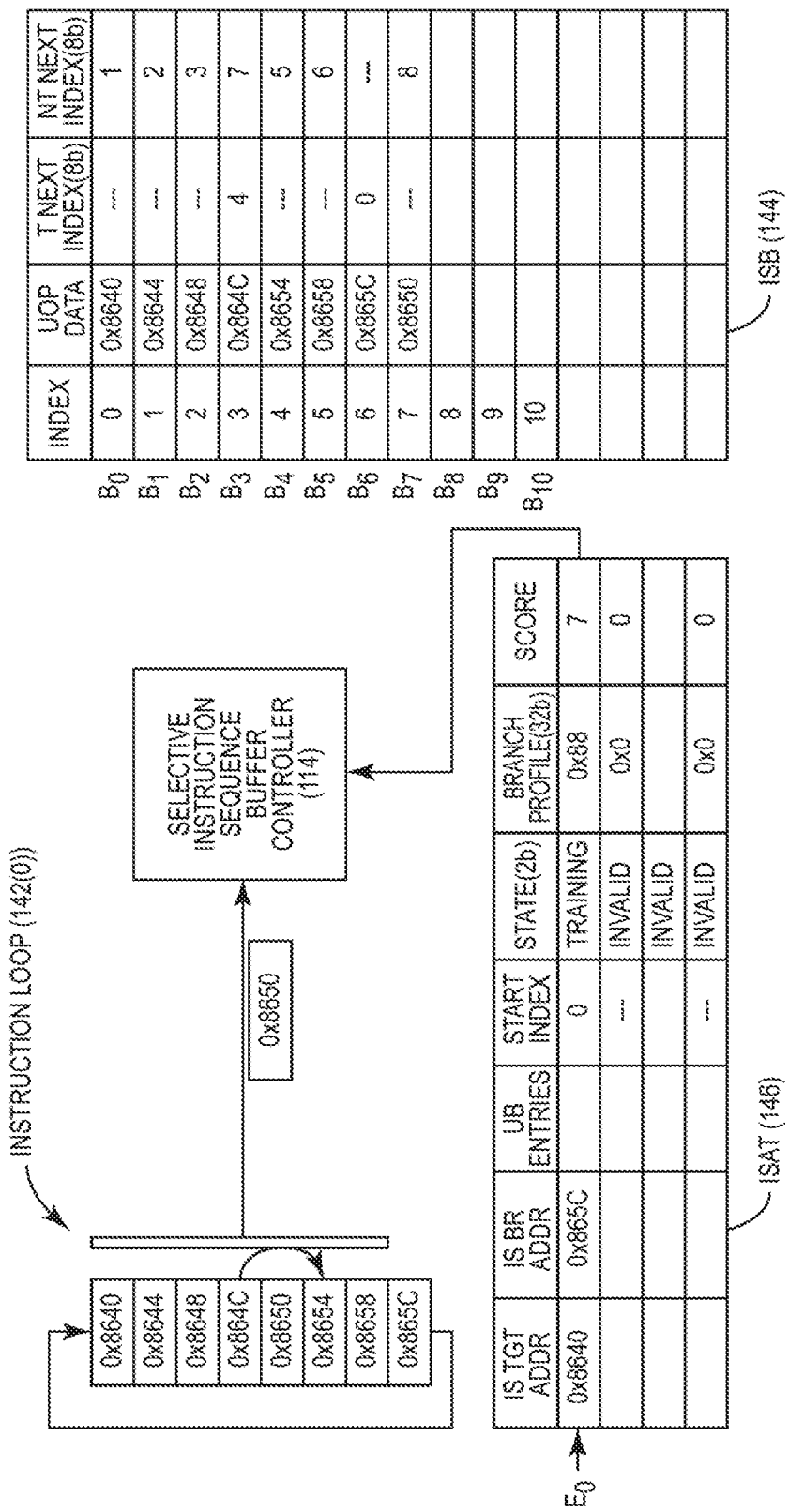
Figure 6N:
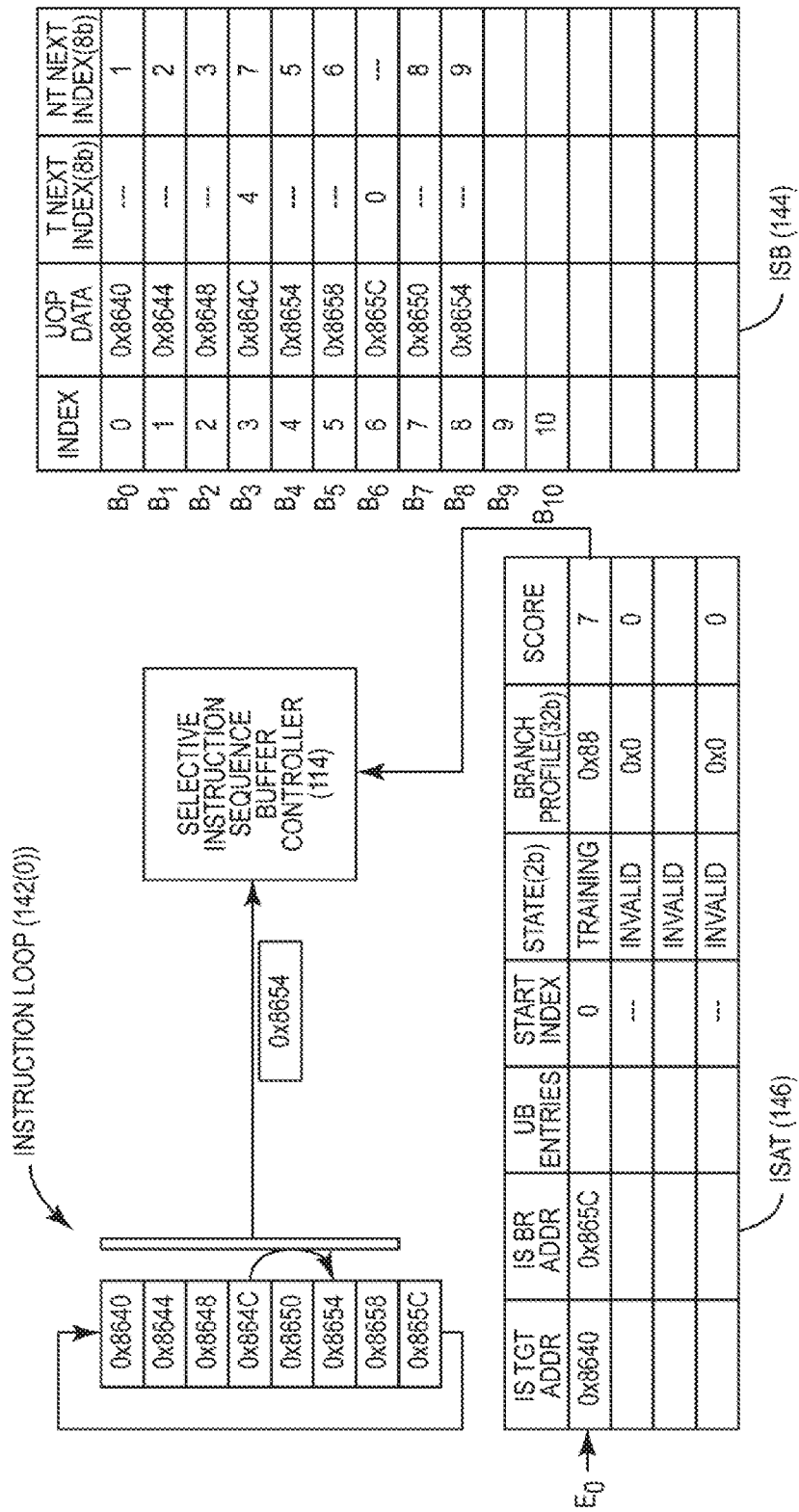
Figure 6O:
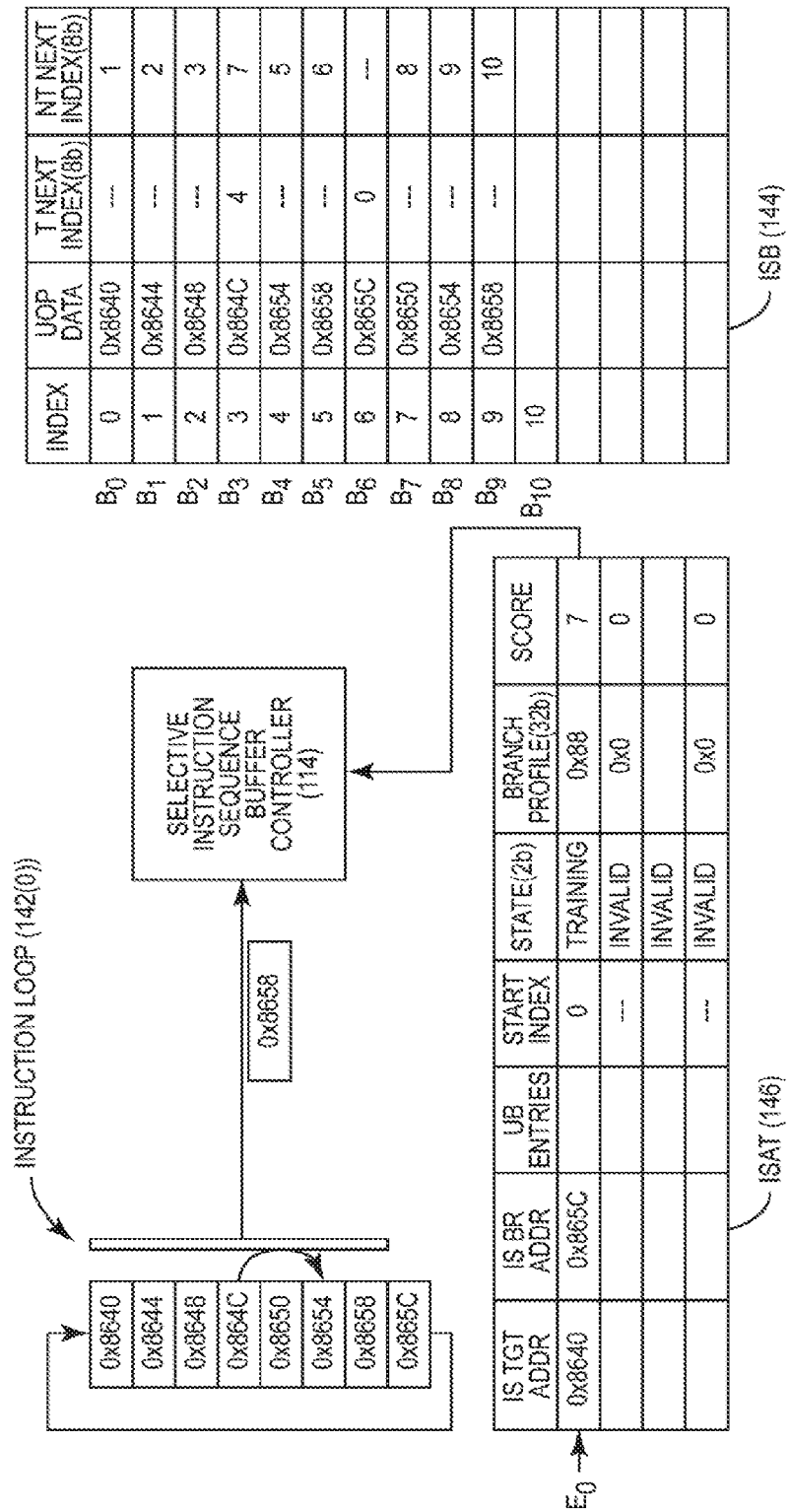
Figure 6P:
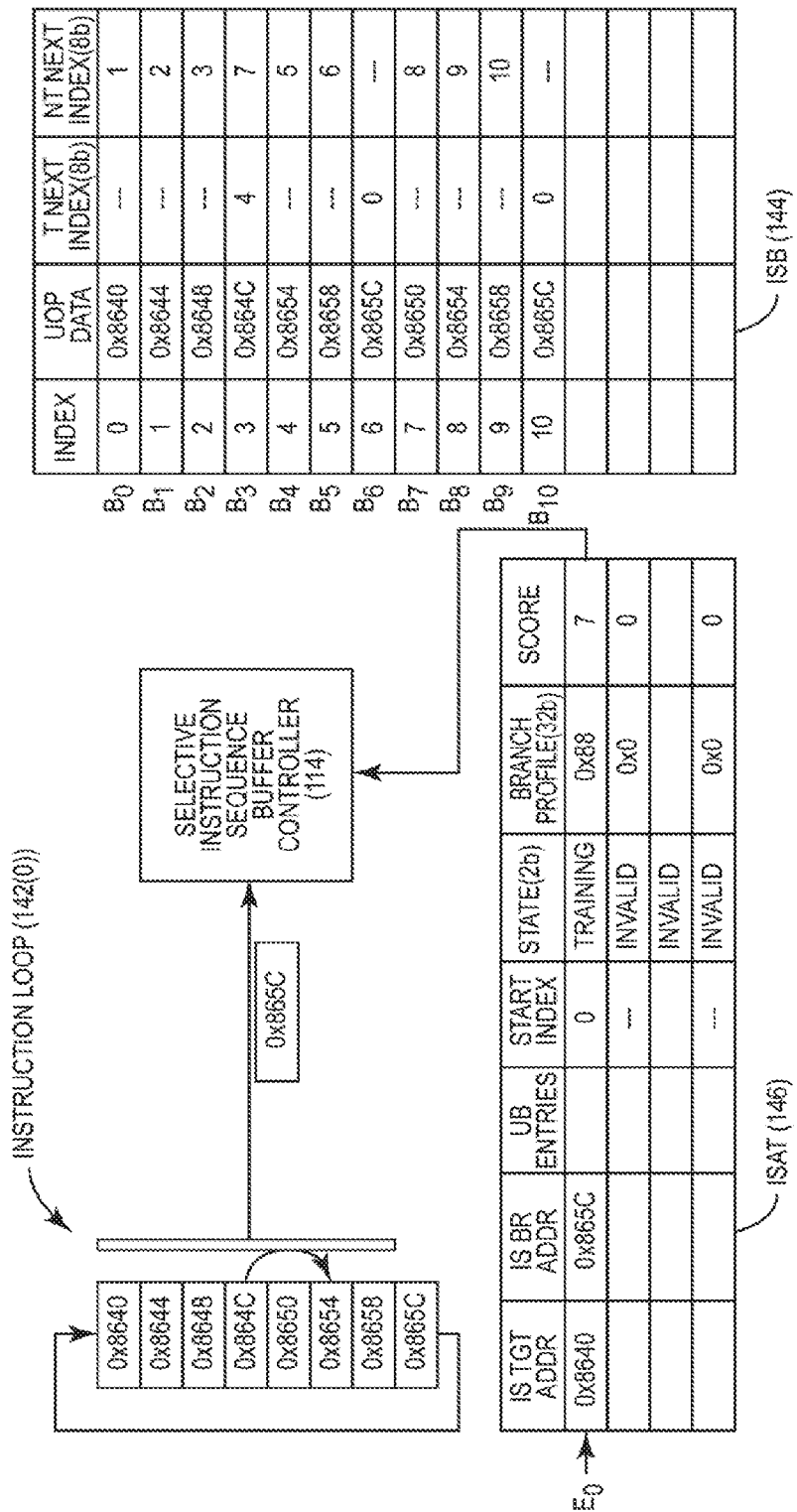
Figure 6Q:
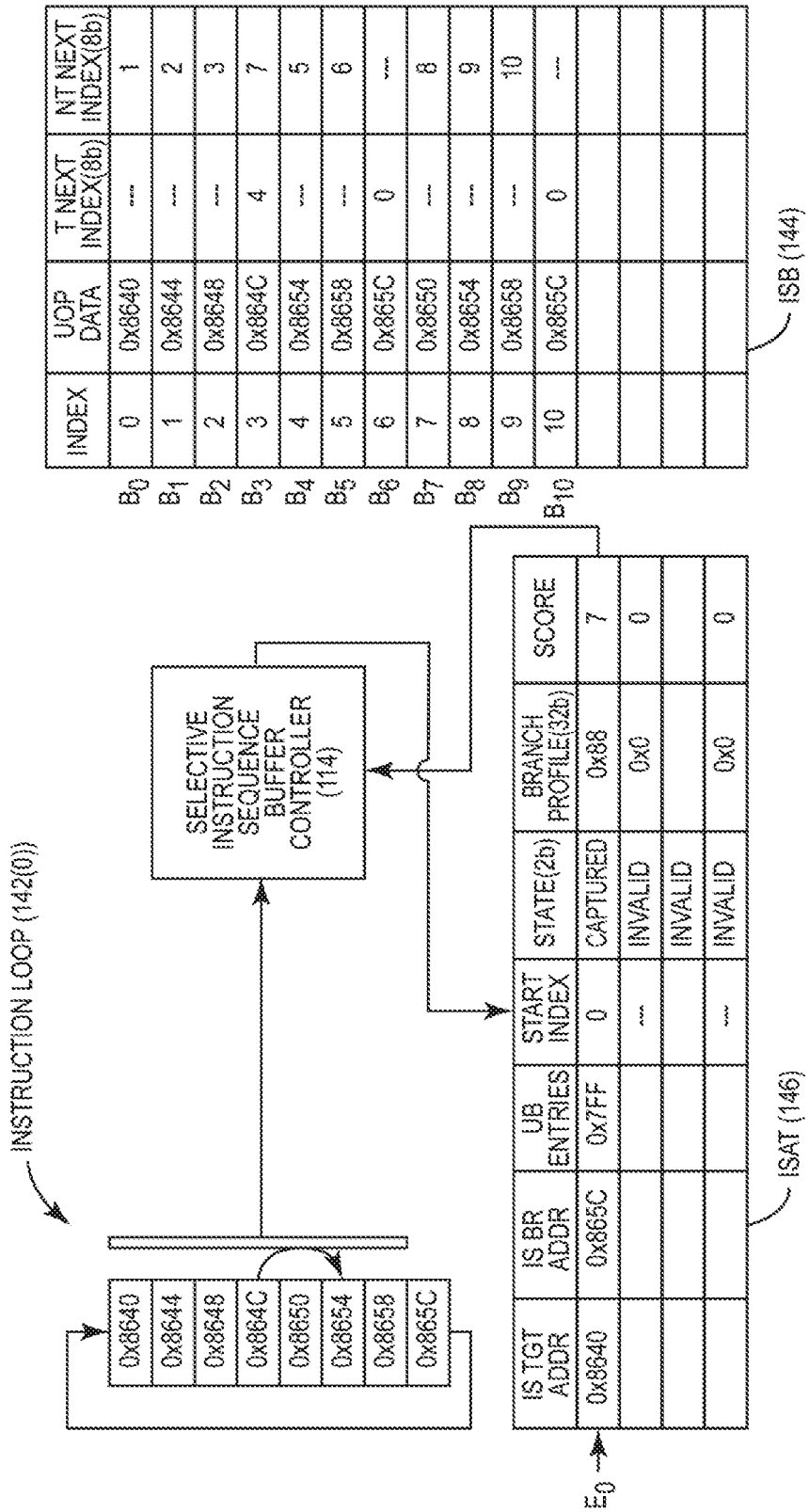

However, FIG. 6K illustrates that upon re-storing the instruction address 108 0x864C, the branch instruction is not taken in this iteration, as opposed to being taken in the previous iteration due to program flow. Thus, the STATE of the entry $E_0$ is set back to training (e.g., TRAINING). In this manner, FIG. 6L illustrates that when re-storing the micro-ops 128 corresponding to the instruction address 108 0x864C in entry $B_3$ (e.g., Index 3) of the ISB 144, the not taken (NT) index is set to 7 instead of no value. Continuing this iteration of the instruction loop 142(0), FIG. 6M illustrates the selective instruction sequence buffer controller 114 storing the micro-ops 128 corresponding to the instruction address 108 0x8650 in entry $B_7$ (e.g., Index 7) of the ISB 144, with a taken (T) index of no value and a not taken (NT) index of 8. Further, FIG. 6N illustrates the selective instruction sequence buffer controller 114 storing the micro-ops 128 corresponding to the instruction address 108 0x8654 in entry $B_8$ (e.g., Index 8) of the ISB 144, with a taken (T) index of no value and a not taken (NT) index of 9. FIG. 6O illustrates the selective instruction sequence buffer controller 114 storing the micro-ops 128 corresponding to the instruction address 108 0x8658 in entry $B_9$ (e.g., Index 9) of the ISB 144, with a taken (T) index of no value and a not taken (NT) index of 10. FIG. 6P illustrates the selective instruction sequence buffer controller 114 storing the micro-ops 128 corresponding to the instruction address 108 0x865C in entry $B_{10}$ (e.g., Index 10) of the ISB 144, with a taken (T) index of 0 and a not taken (NT) index of no value. Because the instruction address 108 0x865C represents the backwards-taken branch instruction at the end of the instruction loop 142(0), the instruction loop 142(0) is fully recaptured. Thus, the STATE of entry $E_0$ is changed from training (e.g., TRAINING) back to captured (e.g., CAPTURED), as illustrated in FIG. 6Q. Further, FIG. 6Q illustrates the selective instruction sequence buffer controller 114 updating the bit vector (UB ENTRIES) that stores information about the entries $B_0$-$B_{10}$ in the ISB 144 that correspond to the instruction loop 142(0). In this example, the value 0x7FF in the bit vector (UB ENTRIES) indicates that entries in the ISB 144 corresponding to 0x7FF are being used by the instruction loop 142(0).

In addition to the scenario described in the above example, with continuing reference to FIGS. 5A and 5B, if the instruction address 108 is not stored in the ISAT 146, the selective instruction sequence buffer controller 114 instructs the instruction fetch circuit 110 in FIG. 1 to perform a fetch (block 324 in FIG. 5B). Although the instruction address 108 is not stored in the ISAT 146, the selective instruction sequence buffer controller 114 is configured to determine if the instruction address 108 corresponds to a backwards-taken branch instruction (block 326 in FIG. 5B). If the instruction address 108 is not a backwards-taken branch instruction, the selective instruction sequence buffer controller 114 is done with the iteration corresponding to the instruction address 108 in block 311. However, if the instruction address 108 is a backwards-taken branch instruction, the selective instruction sequence buffer controller 114 determines if the corresponding instruction loop 142(0)-142 (M) may be captured in the ISB 144. To make such a determination, the selective instruction sequence buffer controller 114 determines whether there is an available entry $E_0$-$E_P$ in the ISAT 146 (block 328 in FIG. 5B). For example, the selective instruction sequence buffer controller 114 determines if there are any entries $E_0$-$E_P$ with invalid or overwritten states. If an entry $E_0$-$E_P$ has an invalid or overwritten state, the selective instruction sequence buffer controller 114 stores the instruction address 108 in the ISAT 146 and sets the entry $E_0$-$E_P$ to a training state (e.g., TRAINING) and is done with the iteration corresponding to the instruction address 108 in block 311 (block 330 in FIG. 5B).

On the other hand, if the selective instruction sequence buffer controller 114 determines that there are no entries $E_0$-$E_P$ with invalid or overwritten states in block 328, the selective instruction sequence buffer controller 114 reduces (e.g., decrements) the FI (SCORE) of each entry $E_0$-$E_P$ (block 332 in FIG. 5B). At this point, the selective instruction sequence buffer controller 114 determines if any entries $E_0$-$E_P$ have a FI (SCORE) less than an eviction threshold (block 334 in FIG. 5B). If there are no FI (SCORE) less than the eviction threshold, the selective instruction sequence buffer controller 114 is done with the iteration corresponding to the instruction address 108 in block 311. However, if there are FI (SCORE) less than the eviction threshold, each corresponding entry $E_0$-$E_P$ is set to an invalid state (e.g., INVALID) (block 336 in FIG. 5B). After setting each corresponding entry $E_0$-$E_P$ to an invalid state (e.g., INVALID) in block 336, the selective instruction sequence buffer controller 114 is done with the iteration corresponding to the instruction address 108 in block 311. Notably, other aspects may evict an entry $E_0$-$E_P$ if a FI (SCORE) is less than or equal to the eviction threshold, rather than if a FI (SCORE) is less than the eviction threshold, as in the above example. Aspects that evict an entry $E_0$-$E_P$ if a FI (SCORE) is less than or equal to the eviction threshold evict an entry $E_0$-$E_P$ at a FI (SCORE) one value higher as compared to aspects that evict an entry $E_0$-$E_P$ at a FI (SCORE) less than the eviction threshold.

After the instruction loop 142(0) is fully captured in the ISB 144 as illustrated in FIG. 6Q, the ISB 144 includes multiple entries $B_0$-$B_X$ corresponding to the instruction address 108 0x8654 (entries $B_4$, $B_8$), which correspond to the target of a forward-taken branch instruction of the instruction address 108 0x864C. This is due to the fact that the selective instruction sequence buffer controller 114 stores the micro-ops 128 corresponding to each instruction address 108 in the order in which each instruction address 108 is accessed in the instruction loop 142(0). As referenced previously, to reduce such multiple entries $B_0$-$B_X$ in the ISB 144, the selective instruction sequence buffer controller 114 may be configured to communicate with the TAT 150 in FIG. 1.

In this regard, FIG. 7 illustrates the exemplary TAT 150 that may be used in conjunction with the selective instruction sequence buffer controller 114, the ISB 144, and the ISAT 146 in the example illustrated in FIGS. 6A-6Q. As discussed below, employing the TAT 150 allows the selective instruction sequence buffer controller 114 to reduce the number of entries $B_0$-$B_{10}$ of the ISB 144 in which micro-ops 128 are stored, as illustrated by entries $B_0$-$B_7$ in the updated ISB 144'.

In this regard, the TAT 150 is configured to store indices of the entries $B_0$-$B_{10}$ in the ISB 144 that store micro-ops 128 corresponding to target instruction addresses 108 of forward-taken branch instructions. Storing such indices allows the selective instruction sequence buffer controller 114 to reduce the number of repetitive entries $B_0$-$B_{10}$ in the ISB 144. In other words, the selective instruction sequence buffer controller 114 communicates with the TAT 150 to merge multiple entries $B_0$-$B_{10}$ in the ISB 144 corresponding to a particular instruction address 108 of the instruction loop 142(0) into one entry $B_0$-$B_{10}$ to achieve increased efficiency. In this manner, the selective instruction sequence buffer controller 114 searches the TAT 150 when capturing the instruction loop 142(0). To determine the entry $B_0$-$B_{10}$ in which to capture the micro-ops 128 (UOP DATA) of the instruction sequence 142(0), the selective instruction sequence buffer controller 114 determines if the TAT 150 includes a target instruction address 108 of a forward-taken branch instruction. If the selective instruction sequence buffer controller 114 determines that the TAT 150 does not include a target instruction address 108, the selective instruction sequence buffer controller 114 captures the micro-ops 128 corresponding to the current instruction address 108, as well as applicable taken (T) and not taken (NT) indices, into a free entry $B_0$-$B_{10}$ in the ISB 144. In other words, if the TAT 150 does not include the target instruction address 108 being processed by the selective instruction sequence buffer controller 114, the selective instruction sequence buffer controller 114 captures the target instruction address 108 and applicable taken (T) and not taken (NT) indices in the next available entry $B_0$-$B_{10}$ in the ISB 144.

However, if the selective instruction sequence buffer controller 114 determines that the TAT 150 does include a target instruction address 108, the selective instruction sequence buffer controller 114 determines if the TAT 150 includes a corresponding index to an entry $B_0$-$B_{10}$. If the TAT 150 includes a corresponding index to an entry $B_0$-$B_{10}$, the selective instruction sequence buffer controller 114 copies the corresponding index into the taken (T) index of the entry $B_0$-$B_{10}$ of the ISB 144 in which the target instruction address 108 is captured instead of capturing the instruction address 108 into the next available entry $B_0$-$B_{10}$. Notably, because the target instruction address 108 is already captured in the ISB 144, the not taken (NT) index was previously populated accordingly. Further, if the TAT 150 includes a target instruction address 108 but does not include an index corresponding to an entry $B_0$-$B_{10}$ in the ISB 144, if the forward-taken branch instruction is predicted as taken, the selective instruction sequence buffer controller 114 stores an index corresponding to the entry $B_0$-$B_{10}$ in the TAT 150. The TAT 150 is reset if any ISB 144 entry $B_0$-$B_{10}$ no longer corresponds to a captured state in the ISAT 146.

Figure 8:
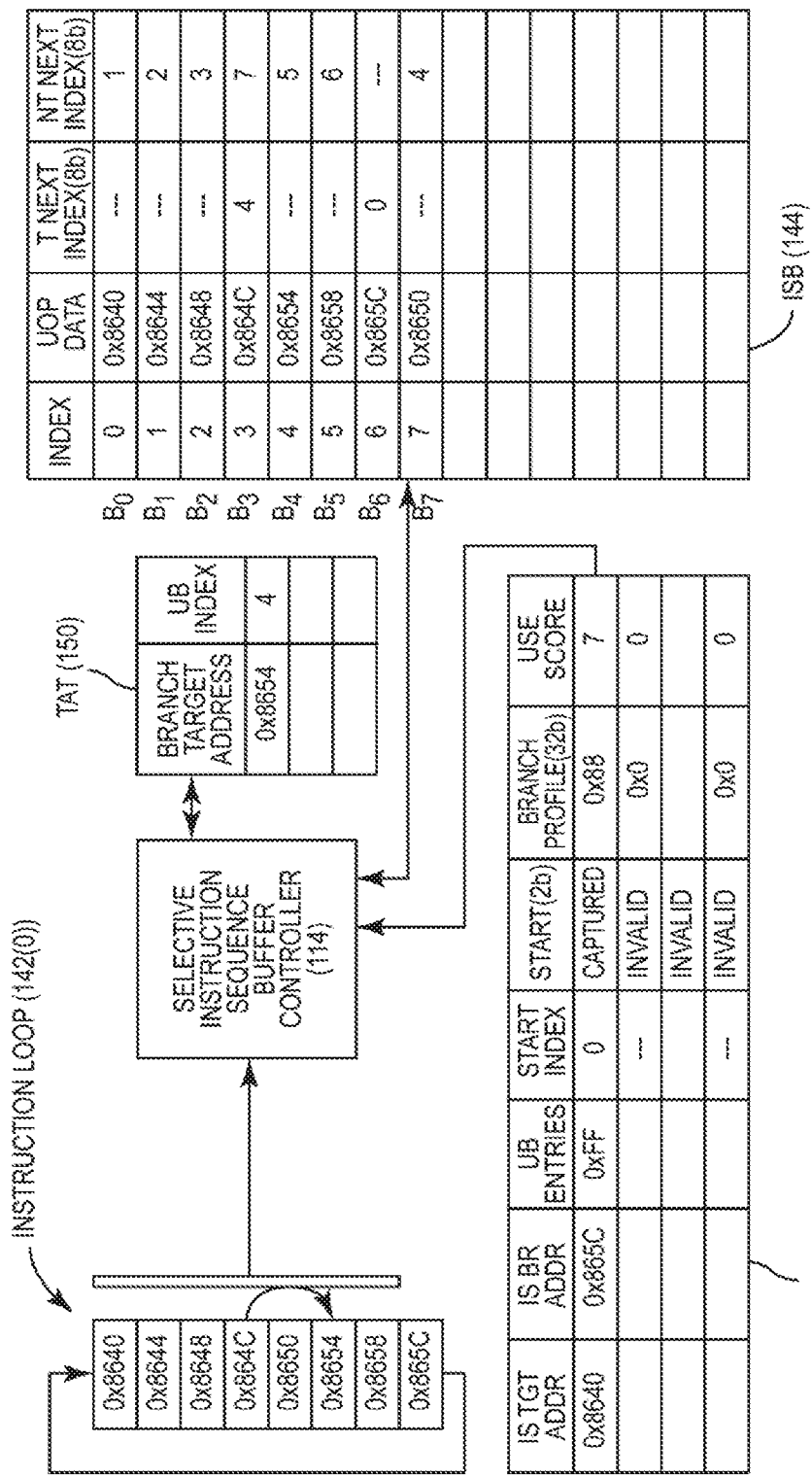
FIG. 8 is a diagram of the ISAT and the updated ISB controlled by the selective instruction sequence buffer controller in FIG. 1 during exemplary operation when employing the TAT in FIG. 7.

Thus, as illustrated in FIG. 7, the selective instruction sequence buffer controller 114 searches the TAT 150 during the capture sequence previously described in FIGS. 5, 6A-6Q. The selective instruction sequence buffer controller 114 determines that the instruction address 108 0x8654 (BRANCH TARGET ADDRESS) in the entry $B_4$ at index 4 (INSTRUCTION SEQUENCE BUFFER INDEX 4) may have entries $B_0$-$B_{10}$ in the ISB 144 that may be merged. In this aspect, the selective instruction sequence buffer controller 114 merges the entries $B_0$-$B_{10}$ such that any entries $B_0$-$B_{10}$ that may be merged with another entry $B_0$-$B_{10}$ are merged into the entry $B_0$-$B_{10}$ located at the lesser numbered index. Thus, the selective instruction sequence buffer controller 114 merges the entries $B_4$, $B_8$ into the entry $B_4$. Further, the selective instruction sequence buffer controller 114 merges the entries sequentially following the entry $B_8$ which also have multiple entries $B_0$-$B_{10}$. Thus, the entry $B_9$ corresponding to the instruction address 108 0x8658 is merged with the entry $B_5$, while the entry $B_{10}$ corresponding to the instruction address 108 0x865C is merged with the entry B6. As a result, the updated ISB 144' includes the entries $B_0$-$B_7$, as opposed to the entries $B_0$-$B_{10}$ in the ISB 144 prior to merging using the TAT 150. FIG. 8 illustrates the TAT 150 in conjunction with the selective instruction sequence buffer controller 114 and the ISAT 146, as well as the updated ISB 144'. Therefore, the TAT 150 may be used to provide a level of convergence control by helping to reduce repetitive entries in the ISB 144, and thus, increase efficiency of the instruction processing system 100 in FIG. 1.

The elements described herein are sometimes referred to as means for performing particular functions. In this regard, the selective instruction sequence buffer controller 114 is sometimes referred to herein as a "means for receiving an instruction address for a next instruction to be fetched for execution into an instruction pipeline in an instruction processing system." The selective instruction sequence buffer controller 114 is also sometimes referred to herein as a "means for determining if the received instruction address corresponds to a captured instruction sequence in an instruction sequence buffer." Further, the selective instruction sequence buffer controller 114 is sometimes referred to herein as a "means for providing the micro-operations corresponding to the captured instruction sequence in the instruction sequence buffer for execution by the execution circuit." Additionally, the selective instruction sequence buffer controller 114 is sometimes referred to herein as a "means for reducing a frequency indicator corresponding to the captured instruction sequence in the instruction sequence buffer."

Selective storing of previously decoded instructions of frequently-called instruction sequences in an instruction sequence buffer to be executed by a processor according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 9:
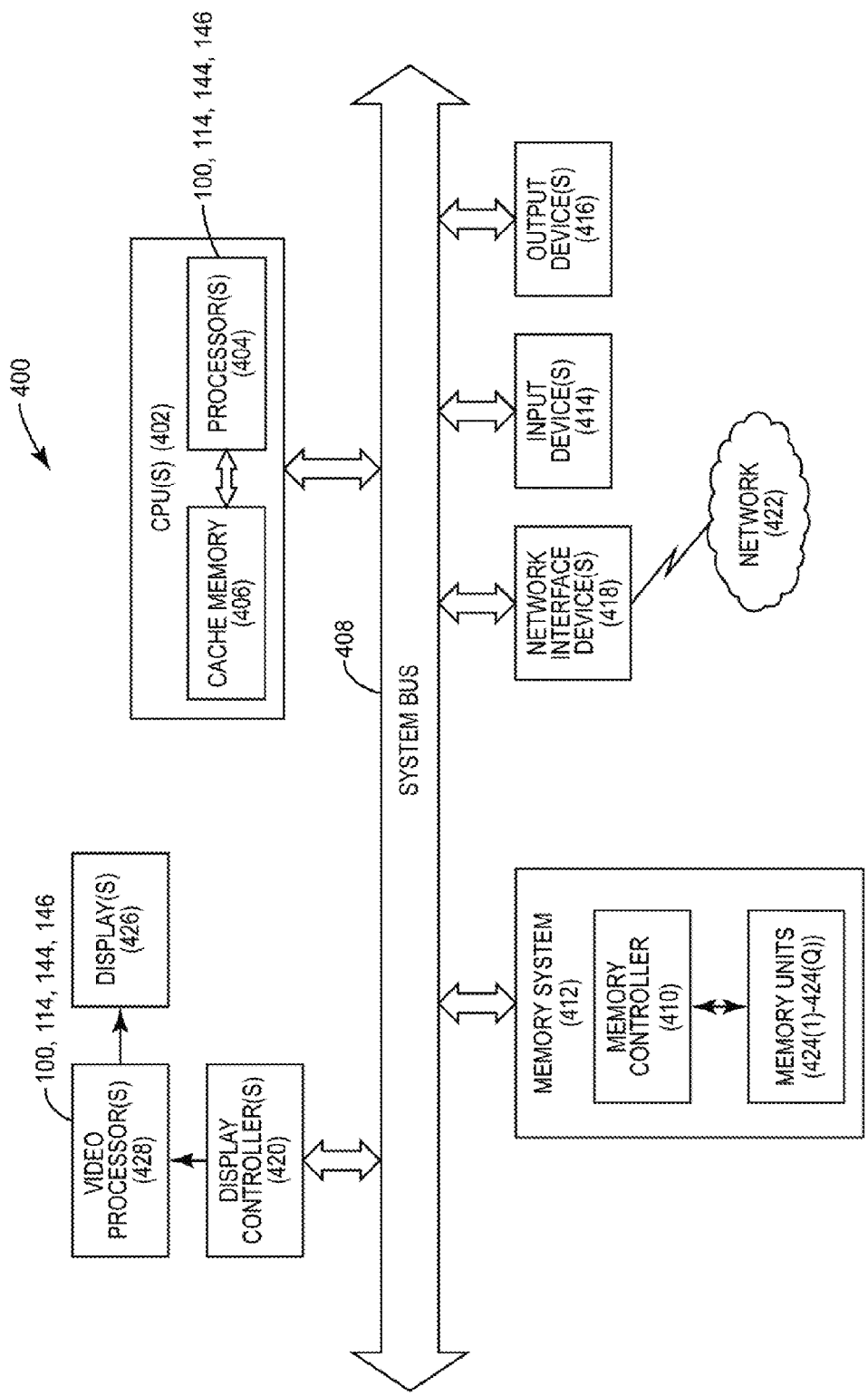
FIG. 9 is a block diagram of an exemplary processor-based system that can include the selective instruction sequence buffer controller, the ISB, and the ISAT in FIG. 1.

In this regard, FIG. 9 illustrates an example of a processor-based system 400 that can employ processing systems that may include the selective instruction sequence buffer controller 114, the ISB 144, and the ISAT 146 illustrated in FIG. 1. In this example, the processor-based system 400 includes one or more central processing units (CPUs) 402, each including one or more processors 404. The CPU(s) 402 may have cache memory 406 coupled to the processor(s) 404 for rapid access to temporarily stored data. The CPU(s) 402 is coupled to a system bus 408 and can intercouple master and slave devices included in the processor-based system 400. As is well known, the CPU(s) 402 communicates with these other devices by exchanging address, control, and data information over the system bus 408. For example, the CPU(s) 402 can communicate bus transaction requests to a memory controller 410 as an example of a slave device. Although not illustrated in FIG. 9, multiple system buses 408 could be provided, wherein each system bus 408 constitutes a different fabric.

Other master and slave devices can be connected to the system bus 408. As illustrated in FIG. 9, these devices can include a memory system 412, one or more input devices 414, one or more output devices 416, one or more network interface devices 418, and one or more display controllers 420, as examples. The input device(s) 414 can include any type of input device, including but not limited to input keys, switches, voice processors, etc. The output device(s) 416 can include any type of output device, including but not limited to audio, video, other visual indicators, etc. The network interface device(s) 418 can be any device configured to allow exchange of data to and from a network 422. The network 422 can be any type of network, including but not limited to a wired or wireless network, a private or public network, a local area network (LAN), a wireless local area network (WLAN), a wide area network (WAN), a BLUETOOTH™ network, or the Internet. The network interface device(s) 418 can be configured to support any type of communications protocol desired. The memory system 412 can include one or more memory units 424(1)-424(Q).

The CPU(s) 402 may also be configured to access the display controller(s) 420 over the system bus 408 to control information sent to one or more displays 426. The display controller(s) 420 sends information to the display(s) 426 to be displayed via one or more video processors 428, which process the information to be displayed into a format suitable for the display(s) 426. The display(s) 426 can include any type of display, including but not limited to a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A selective instruction sequence buffer controller for selectively storing previously decoded instructions for an instruction sequence to be executed by a processor, the selective instruction sequence buffer controller configured to:
   receive an instruction address for a next instruction to be fetched for execution into an instruction pipeline in an instruction processing system;
   determine if the received instruction address corresponds to a captured instruction sequence in an instruction sequence buffer, the captured instruction sequence comprising micro-operations of corresponding instructions configured to be executed by an execution circuit in the instruction pipeline for execution of the captured instruction sequence;
   responsive to determining that the received instruction address corresponds to a captured instruction sequence in the instruction sequence buffer, provide the micro-operations corresponding to the captured instruction sequence in the instruction sequence buffer for execution by the execution circuit; and
   responsive to determining that the received instruction address does not correspond to a captured instruction sequence in the instruction sequence buffer, reduce a frequency indicator corresponding to the captured instruction sequence in the instruction sequence buffer, the frequency indicator indicative of a frequency in which the captured instruction sequence is executed by the instruction processing system.

2. The selective instruction sequence buffer controller of claim 1 further configured to:
   responsive to determining that the received instruction address does not correspond to a captured instruction sequence in the instruction sequence buffer, determine if the instruction address corresponds to an instruction sequence that may be captured in the instruction sequence buffer;
   responsive to determining that the received instruction address corresponds to an instruction sequence that may be captured in the instruction sequence buffer, increase the frequency indicator corresponding to the instruction sequence;
   responsive to increasing the frequency indicator corresponding to the instruction sequence, determine if the frequency indicator corresponding to the instruction sequence is greater than or equal to a capture threshold;

responsive to determining that the frequency indicator corresponding to the instruction sequence is greater than or equal to the capture threshold, determine if the instruction sequence corresponding to the instruction address may be captured in the instruction sequence buffer; and responsive to determining that the instruction sequence corresponding to the instruction address may be captured in the instruction sequence buffer, capture the instruction sequence corresponding to the instruction address in the instruction sequence buffer.

3. The selective instruction sequence buffer controller of claim 2 further configured to:

responsive to reducing the frequency indicator corresponding to the captured instruction sequence in the instruction sequence buffer, determine if the frequency indicator is less than an eviction threshold; and responsive to determining that the frequency indicator is less than the eviction threshold, change a state of the instruction sequence captured in the instruction sequence buffer to invalid.

4. The selective instruction sequence buffer controller of claim 3 further configured to determine if the received instruction address corresponds to a captured instruction sequence in the instruction sequence buffer by being configured to:

determine if the instruction address is stored in an entry of a plurality of entries in an instruction sequence address table; and responsive to determining that the instruction address is stored in an entry in the instruction sequence address table, determine if the instruction address has a state set to captured.

5. The selective instruction sequence buffer controller of claim 4 further configured to reduce the frequency indicator corresponding to the captured instruction sequence in the instruction sequence buffer by being configured to decrement the frequency indicator of the instruction address in a corresponding entry in the instruction sequence address table.

6. The selective instruction sequence buffer controller of claim 5 further configured to determine if the instruction address corresponds to an instruction sequence that may be captured in the instruction sequence buffer by being configured to:

determine if an entry of the plurality of entries in the instruction sequence address table has the instruction address with a state of training;

responsive to determining that an entry of the plurality of entries in the instruction sequence address table does not have the instruction address with a state of training, determine if the instruction address corresponds to a backwards-taken branch instruction;

responsive to determining that the instruction address corresponds to a backwards-taken branch instruction, determine if an entry of the plurality of entries in the instruction sequence address table has a state of invalid or overwritten; and responsive to determining that an entry of the plurality of entries in the instruction sequence address table has a state of invalid or overwritten, change the entry corresponding to the instruction address to a state of training.

7. The selective instruction sequence buffer controller of claim 6 further configured to:

determine if the instruction sequence corresponding to the instruction address may be captured in the instruction sequence buffer by being configured to determine if the instruction sequence buffer has enough free space to store a plurality of micro-operations corresponding to the instruction address;

responsive to determining that the instruction sequence buffer has enough free space, capture the instruction sequence corresponding to the instruction address by being configured to set an entry in the instruction sequence address table corresponding to the instruction address to a state of captured; and responsive to determining that the instruction sequence buffer has enough free space, capture the instruction sequence corresponding to the instruction address by being configured to store the plurality of micro-operations corresponding to the instruction address in the instruction sequence buffer.

8. The selective instruction sequence buffer controller of claim 7, wherein determining if the instruction sequence buffer has enough free space to store the plurality of micro-operations corresponding to the instruction address in the instruction sequence buffer comprises determining if a free list indicates that the instruction sequence buffer has enough free entries.

9. The selective instruction sequence buffer controller of claim 7, wherein storing the plurality of micro-operations corresponding to the instruction address in the instruction sequence buffer comprises storing a taken index and a not taken index with each micro-operation, wherein the taken index points to a next micro-operation in response to a taken branch and the not taken index points to the next micro-operation in response to a not taken branch.

10. The selective instruction sequence buffer controller of claim 7 further configured to, responsive to storing the plurality of micro-operations corresponding to the instruction address to the instruction sequence buffer, update a start index of any entry in the instruction sequence address table that is changed in response to storing the plurality of micro-operations.

11. The selective instruction sequence buffer controller of claim 7 further configured to, responsive to determining that the instruction sequence buffer has enough free space, store each micro-operation corresponding to a taken branch in a corresponding entry of a taken branch instruction in a corresponding entry of a taken address table, wherein the corresponding entry of the taken address table comprises:

an instruction address corresponding to the micro-operation; and an index corresponding to a location within the instruction sequence buffer in which the micro-operation is stored.

12. The selective instruction sequence buffer controller of claim 11 further configured to:

responsive to storing the plurality of micro-operations corresponding to the instruction address in the instruction sequence buffer, search the taken address table for an instruction address corresponding to a micro-operation; and responsive to finding the instruction address in the taken address table, merge multiple entries in the instruction sequence buffer corresponding to the instruction address into one entry in the instruction sequence buffer.

13. The selective instruction sequence buffer controller of claim 1 further configured to, responsive to determining that the received instruction address corresponds to a captured instruction sequence in the instruction sequence buffer, disable an instruction fetch circuit from fetching an instruction corresponding to the instruction address.

14. The selective instruction sequence buffer controller of claim 1 further configured to, responsive to determining that the received instruction address corresponds to a captured instruction sequence in the instruction sequence buffer, disable an instruction decode circuit from decoding an instruction corresponding to the instruction address.

15. The selective instruction sequence buffer controller of claim 1, wherein each instruction sequence comprises an instruction loop.

16. The selective instruction sequence buffer controller of claim 1 integrated into an integrated circuit (IC).

17. The selective instruction sequence buffer controller of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA);
   a monitor; a computer monitor; a television; a tuner; a radio; a satellite radio; a music player; a digital music player; a portable music player; a digital video player; a video player; a digital video disc (DVD) player; a portable digital video player; and an automobile.

18. A selective instruction sequence buffer controller for selectively storing previously decoded instructions for an instruction sequence to be executed by a processor, the selective instruction sequence buffer controller comprising:
   means for receiving an instruction address for a next instruction to be fetched for execution into an instruction pipeline in an instruction processing system;
   means for determining if the received instruction address corresponds to a captured instruction sequence in an instruction sequence buffer, the captured instruction sequence comprising micro-operations of corresponding instructions configured to be executed by an execution circuit in the instruction pipeline for execution of the captured instruction sequence;
   means for providing the micro-operations corresponding to the captured instruction sequence in the instruction sequence buffer for execution by the execution circuit in response to determining that the received instruction address corresponds to a captured instruction sequence in the instruction sequence buffer; and
   means for reducing a frequency indicator corresponding to the captured instruction sequence in the instruction sequence buffer, the frequency indicator indicative of a frequency in which the captured instruction sequence is executed by the instruction processing system, in response to determining that the received instruction address does not correspond to a captured instruction sequence in the instruction sequence buffer.

19. A method for selectively storing previously decoded instructions for an instruction sequence to be executed by a processor, comprising:
   receiving an instruction address for a next instruction to be fetched for execution into an instruction pipeline in an instruction processing system;
   determining if the received instruction address corresponds to a captured instruction sequence in an instruction sequence buffer, the captured instruction sequence comprising micro-operations of corresponding instructions configured to be executed by an execution circuit in the instruction pipeline for execution of the captured instruction sequence;
   responsive to determining that the received instruction address corresponds to a captured instruction sequence in the instruction sequence buffer,
   providing the micro-operations corresponding to the captured instruction sequence in the instruction sequence buffer for execution by the execution circuit; and
   responsive to determining that the received instruction address does not correspond to a captured instruction sequence in the instruction sequence buffer, reducing a frequency indicator corresponding to the captured instruction sequence in the instruction sequence buffer, the frequency indicator indicative of a frequency in which the captured instruction sequence is executed by the instruction processing system.

20. The method of claim 19, further comprising:
   responsive to determining that the received instruction address does not correspond to a captured instruction sequence in the instruction sequence buffer, determine if the instruction address corresponds to an instruction sequence that may be captured in the instruction sequence buffer;
   responsive to determining that the received instruction address corresponds to an instruction sequence that may be captured in the instruction sequence buffer, increase the frequency indicator corresponding to the instruction sequence;
   responsive to increasing the frequency indicator corresponding to the instruction sequence, determine if the frequency indicator corresponding to the instruction sequence is greater than or equal to a capture threshold;
   responsive to determining that the frequency indicator corresponding to the instruction sequence is greater than or equal to the capture threshold, determine if the instruction sequence corresponding to the instruction address may be captured in the instruction sequence buffer; and
   responsive to determining that the instruction sequence corresponding to the instruction address may be captured in the instruction sequence buffer, capture the instruction sequence corresponding to the instruction address in the instruction sequence buffer.

21. The method of claim 20, further comprising:
   responsive to reducing the frequency indicator corresponding to the captured instruction sequence in the instruction sequence buffer, determining if the frequency indicator is less than an eviction threshold; and
   responsive to determining that the frequency indicator is less than the eviction threshold, changing a state of the instruction sequence captured in the instruction sequence buffer to invalid.

22. An instruction processing system for a processor, comprising:
   one or more instruction pipelines each comprising an instruction fetch circuit configured to fetch instructions, an instruction decode circuit configured to decode instructions fetched by the instruction fetch circuit, and an execution circuit configured to execute the decoded instructions; and
   a selective instruction sequence buffer controller for selectively storing the previously decoded instructions for an instruction sequence to be executed by the instruction processing system, the selective instruction sequence buffer controller configured to:
   receive an instruction address for a next instruction to be fetched for execution into an instruction pipeline in the instruction processing system;

determine if the received instruction address corresponds to a captured instruction sequence in an instruction sequence buffer, the captured instruction sequence comprising micro-operations of corresponding instructions configured to be executed by the execution circuit in the instruction pipeline for execution of the captured instruction sequence;

responsive to determining that the received instruction address corresponds to a captured instruction sequence in the instruction sequence buffer, provide the micro-operations corresponding to the captured instruction sequence in the instruction sequence buffer for execution by the execution circuit; and responsive to determining that the received instruction address does not correspond to the captured instruction sequence in the instruction sequence buffer, reduce a frequency indicator corresponding to the captured instruction sequence in the instruction sequence buffer, the frequency indicator indicative of a frequency in which the captured instruction sequence is executed by the instruction processing system.

23. The instruction processing system of claim 22, wherein the selective instruction sequence buffer controller is further configured to:

responsive to determining that the received instruction address does not correspond to a captured instruction sequence in the instruction sequence buffer, determine if the instruction address corresponds to an instruction sequence that may be captured in the instruction sequence buffer;

responsive to determining that the received instruction address corresponds to an instruction sequence that may be captured in the instruction sequence buffer, increase the frequency indicator corresponding to the instruction sequence;

responsive to increasing the frequency indicator corresponding to the instruction sequence, determine if the frequency indicator corresponding to the instruction sequence is greater than or equal to a capture threshold;

responsive to determining that the frequency indicator corresponding to the instruction sequence is greater than or equal to the capture threshold, determine if the instruction sequence corresponding to the instruction address may be captured in the instruction sequence buffer; and responsive to determining that the instruction sequence corresponding to the instruction address may be captured in the instruction sequence buffer, capture the instruction sequence corresponding to the instruction address in the instruction sequence buffer.

24. The instruction processing system of claim 23, wherein the selective instruction sequence buffer controller is further configured to:

responsive to reducing the frequency indicator corresponding to the captured instruction sequence in the instruction sequence buffer, determine if the frequency indicator is less than an eviction threshold; and responsive to determining that the frequency indicator is less than the eviction threshold, change a state of the instruction sequence captured in the instruction sequence buffer to invalid.

25. The instruction processing system of claim 24, wherein the selective instruction sequence buffer controller is further configured to determine if the received instruction address corresponds to a captured instruction sequence in the instruction sequence buffer by being configured to:

determine if the instruction address is stored in an entry of a plurality of entries in an instruction sequence address table; and responsive to determining that the instruction address is stored in an entry in an instruction sequence address table, determine if the instruction address has a state set to captured.

26. The instruction processing system of claim 25, wherein the selective instruction sequence buffer controller is further configured to reduce the frequency indicator corresponding to the captured instruction sequence in the instruction sequence buffer by being configured to decrement the frequency indicator of the instruction address in a corresponding entry in the instruction sequence address table.

27. The instruction processing system of claim 26, wherein the selective instruction sequence buffer controller is further configured to determine if the instruction address corresponds to an instruction sequence that may be captured in the instruction sequence buffer by being configured to:

determine if an entry of the plurality of entries in the instruction sequence address table has the instruction address with a state of training;

responsive to determining that an entry of the plurality of entries in the instruction sequence address table does not have the instruction address with a state of training, determine if the instruction address corresponds to a backwards-taken branch instruction;

responsive to determining that the instruction address corresponds to a backwards-taken branch instruction, determine if an entry of the plurality of entries in the instruction sequence address table has a state of invalid or overwritten; and responsive to determining that an entry of the plurality of entries in the instruction sequence address table has a state of invalid or overwritten, change the entry corresponding to the instruction address to a state of training.

28. The instruction processing system of claim 27, wherein the selective instruction sequence buffer controller is further configured to:

determine if the instruction sequence corresponding to the instruction address may be captured in the instruction sequence buffer by being configured to determine if the instruction sequence buffer has enough free space to store a plurality of micro-operations corresponding to the instruction address;

responsive to determining that the instruction sequence buffer has enough free space, capture the instruction sequence corresponding to the instruction address by being configured to set an entry in the instruction sequence address table corresponding to the instruction address to a state of captured; and responsive to determining that the instruction sequence buffer has enough free space, capture the instruction sequence corresponding to the instruction address by being configured to store the plurality of micro-operations corresponding to the instruction address in the instruction sequence buffer.

29. The instruction processing system of claim 28, wherein storing the plurality of micro-operations corresponding to the instruction address in the instruction sequence buffer comprises storing a taken index and a not taken index with each micro-operation, wherein the taken index points to a next micro-operation in response to a taken branch and the not taken index points to the next micro-operation in response to a not taken branch.

30. The instruction processing system of claim 28, wherein the selective instruction sequence buffer controller is further configured to, responsive to storing the plurality of micro-operations corresponding to the instruction address to the instruction sequence buffer, update a start index of any entry in the instruction sequence address table that is changed in response to storing the plurality of micro-operations.

\* \* \* \* \*

UNITED STATES PATENT AND TRADEMARK OFFICE
CERTIFICATE OF CORRECTION

PATENT NO. : 9,830,152 B2
APPLICATION NO. : 14/977840
DATED : November 28, 2017
INVENTOR(S) : Vignyan Reddy Kothinti Naresh et al.

It is certified that error appears in the above-identified patent and that said Letters Patent is hereby corrected as shown below:

In the Specification

At Column 9, Line 2, change "H" to --FI--.
At Column 9, Line 49, change "H" to --FI--.

Signed and Sealed this
Third Day of April, 2018

Andrei Iancu
*Director of the United States Patent and Trademark Office*